US012307902B2

(12) United States Patent
Choi et al.

(10) Patent No.: US 12,307,902 B2
(45) Date of Patent: May 20, 2025

(54) CLUSTER-BASED APPROACH TO POSITIONING OF VEHICLES IN VEHICLE PLATOONING OR AUTONOMOUS TRUCKING

(71) Applicant: QUALCOMM Incorporated, San Diego, CA (US)

(72) Inventors: Chang-Sik Choi, Seoul (KR); Kapil Gulati, Belle Mead, NJ (US); Sudhir Kumar Baghel, Hillsborough, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 541 days.

(21) Appl. No.: 17/232,907

(22) Filed: Apr. 16, 2021

(65) Prior Publication Data

US 2021/0327280 A1 Oct. 21, 2021

Related U.S. Application Data

(60) Provisional application No. 63/013,331, filed on Apr. 21, 2020.

(51) Int. Cl.
*G08G 1/00* (2006.01)
*H04W 4/48* (2018.01)
*H04W 64/00* (2009.01)

(52) U.S. Cl.
CPC ............ *G08G 1/22* (2013.01); *H04W 4/48* (2018.02); *H04W 64/003* (2013.01); *H04W 64/006* (2013.01)

(58) Field of Classification Search
None
See application file for complete search history.

(56) References Cited

U.S. PATENT DOCUMENTS 9,015,400 B2  4/2015 Zeng
2014/0100734 A1  4/2014 Yamashiro
(Continued)

FOREIGN PATENT DOCUMENTS

CN  110447245 A  11/2019
KR  20190137732 A  12/2019
(Continued)

OTHER PUBLICATIONS

International Search Report and Written Opinion—PCT/US2021/028002—ISA/EPO—Jul. 1, 2021.
Taiwan Search Report—TW110113906—TIPO—Nov. 1, 2024.

*Primary Examiner* — Behrang Badii
*Assistant Examiner* — Paysun Wu
(74) *Attorney, Agent, or Firm* — Procopio, Cory, Hargreaves & Savitch LLP

(57) ABSTRACT

A user equipment in a vehicle (v-UE) may transmit ranging signals, sometimes referred to as physical ranging signals (PRS), via inter-vehicle messages. The vehicle may be designated as a representative of a cluster of vehicles, e.g., in a vehicle platoon, and may broadcast and receive PRS on behalf of the cluster, while no other vehicles in the cluster broadcast PRS. PRS received from single representative vehicle in a separate cluster may be used to determine the inter-cluster distance between the two clusters. If the inter-cluster distance falls below a predetermined threshold, the v-UE may instruct all other vehicles in its cluster to begin broadcasting PRS, so that each vehicle can determine its distance to all other vehicles. Accordingly, the overhead due to broadcast PRS may be minimized until, e.g., accurate positioning between vehicles is warranted.

28 Claims, 5 Drawing Sheets

(56) References Cited

U.S. PATENT DOCUMENTS

| | | |
|---|---|---|
| 2018/0210464 A1 | 7/2018 | Switkes et al. |
| 2019/0195982 A1 | 6/2019 | El Assaad |
| 2019/0360380 A1* | 11/2019 | Dudar .................. F01P 7/14 |
| 2020/0153494 A1 | 5/2020 | Park et al. |
| 2020/0250848 A1* | 8/2020 | Kim .................. G06V 10/25 |
| 2021/0204306 A1* | 7/2021 | Li .................. H04B 7/155 |
| 2021/0344454 A1* | 11/2021 | Lee .................. H04L 5/0064 |

FOREIGN PATENT DOCUMENTS

| | | |
|---|---|---|
| TW | 201836371 A | 10/2018 |
| WO | WO-2014046575 A1 | 3/2014 |
| WO | 2014137970 A1 | 9/2014 |
| WO | 2018169591 A1 | 9/2018 |

\* cited by examiner

CLUSTER-BASED APPROACH TO POSITIONING OF VEHICLES IN VEHICLE PLATOONING OR AUTONOMOUS TRUCKING

CLAIM OF PRIORITY UNDER 35 U.S.C. § 119

This application claims under 35 U.S.C. § 119 the benefit of and priority to U.S. Provisional Application No. 63/013,331, filed Apr. 21, 2020, and entitled "A CLUSTER-BASED APPROACH TO POSITIONING OF VEHICLES IN VEHICLE PLATOONING OR AUTONOMOUS TRUCKING," which is assigned to the assignee hereof and is incorporated herein by reference in its entirety.

BACKGROUND

Background Field

The subject matter disclosed herein relates to wireless communications systems, and more particularly to methods and apparatuses for positioning of mobile devices in a wireless communications system.

Relevant Background

Obtaining accurate position information for user equipment, such as cellular telephones or other wireless communication devices, is becoming prevalent in the communications industry. For example, obtaining highly accurate locations of mobile devices, e.g., in vehicles or used by pedestrians, is essential for autonomous vehicle driving and pedestrian safety applications.

Coordinated or automated movement of mobile devices, such as automated driving, requires communications between the mobile devices. For example, for vehicles, the communications may be direct or indirect, e.g., via an infrastructure component such as a roadside unit (RSU). Inter-vehicle communications, for example, may be used to negotiate maneuvers necessary for automated driving. The inter-vehicle communications used to negotiate maneuvers may provide a current state and a planned (future) intent of a vehicle. The message exchange during these communications, however, necessarily requires time, during which conditions of either the initiating mobile device, the responding mobile device or both may change.

One type of autonomous coordinated movement in which coordinated inter-device communications may be used is platooning. A platoon is a cluster of mobile devices, e.g., vehicles including ground vehicles, such as cars or trucks, and aerial vehicles, including unmanned aerial vehicle (UAV) sometimes referred to as drones, that travel closely together at relatively high speed, for example, on a highway. Vehicle platooning, for example, may be an ad hoc collection of vehicles that are traveling along the same road (highway) for some distance. In another example of vehicle platooning, which may sometimes be referred to as vehicle trucking, vehicles, such as truck or possibly cars, may be clustered together in a more organized fashion. For example, vehicles may be clustered together for travel between specific departure and destination points.

Platooning of mobile devices may be desirable as it will improve reduce fuel consumption due to the aerodynamic effectiveness and performance, increase road capacity, and improve traffic flow.

SUMMARY

A user equipment in a vehicle (v-UE) may transmit ranging signals, sometimes referred to as positioning reference signals or physical ranging signals (PRS), via inter-vehicle messages. The vehicle may be designated as a representative of a cluster of vehicles, e.g., in a vehicle platoon, and may broadcast and receive PRS on behalf of the cluster, while no other vehicles in the cluster broadcast PRS. PRS received from single representative vehicle in a separate cluster may be used to determine the inter-cluster distance between the two clusters. If the inter-cluster distance falls below a predetermined threshold, the v-UE may instruct all other vehicles in its cluster to begin broadcasting PRS, so that each vehicle can determine its distance to all other vehicles. Accordingly, the overhead due to broadcast PRS may be minimized until, e.g., accurate positioning between vehicles is warranted.

In one implementation, a method performed by a first mobile device that is in a first cluster of mobile devices for ranging between clusters of mobile devices, wherein the first mobile device is a first representative mobile device in the first cluster of mobile devices, and wherein a cluster of mobile devices comprises at least two mobile devices, includes receiving a ranging signal broadcast by a second mobile device that is a second cluster of mobile devices, wherein the second mobile device is a second representative mobile device in the second cluster of mobile devices and no other mobile device in the second cluster of mobile devices broadcasts a ranging signal; determining a distance between the first cluster of mobile devices and the second cluster of mobile devices based on the ranging signal received from the second representative mobile device in the second cluster of mobile devices; determining if the distance between the first cluster of mobile devices and the second cluster of mobile devices is greater than a predetermined threshold; and broadcasting a ranging signal, wherein no other mobile device in the first cluster of mobile devices broadcasts a ranging signal when the distance between the first cluster of mobile devices and the second cluster of mobile devices is greater than a predetermined threshold.

In one implementation, a first mobile device capable performing ranging between clusters of mobile devices, the first mobile device is a first representative mobile device in a first cluster of mobile devices, and wherein a cluster of mobile devices comprises at least two mobile devices, includes an external interface for receiving and sending messages; at least one memory; and at least one processor coupled to the external interface and the at least one memory, the at least one processor configured to: receive, via the external interface, a ranging signal broadcast by a second mobile device that is in a second cluster of mobile devices, wherein the second mobile device is a second representative mobile device in the second cluster of mobile devices and no other mobile device in the second cluster of mobile devices broadcasts a ranging signal; determine a distance between the first cluster of mobile devices and the second cluster of mobile devices based on the ranging signal received from the second representative mobile device in the second cluster of mobile devices; determine if the distance between the first cluster of mobile devices and the second cluster of mobile devices is greater than a predetermined threshold; and broadcast, via the external interface, a ranging signal, wherein no other mobile device in the first cluster of mobile devices broadcasts a ranging signal when the distance between the first cluster of mobile devices and the second cluster of mobile devices is greater than the predetermined threshold.

In one implementation, a first mobile device capable performing ranging between clusters of mobile devices, the is a first representative mobile device in a first cluster of mobile devices, and wherein a cluster of mobile devices comprises at least two mobile devices, includes means for receiving a ranging signal broadcast by a second mobile device that is in a second cluster of mobile devices, wherein the second mobile device is a second representative mobile device in the second cluster of mobile devices and no other mobile device in the second cluster of mobile devices broadcasts a ranging signal; means for determining a distance between the first cluster of mobile devices and the second cluster of mobile devices based on the ranging signal received from the second representative mobile device in the second cluster of mobile devices; means for determining if the distance between the first cluster of mobile devices and the second cluster of mobile devices is greater than a predetermined threshold; and means for broadcasting a ranging signal, wherein no other mobile device in the first cluster of mobile devices broadcasts a ranging signal when the distance between the first cluster of mobile devices and the second cluster of mobile devices is greater than the predetermined threshold.

In one implementation, a non-transitory computer readable storage medium including program code stored thereon, the program code is operable to configure at least one processor in a first mobile device to perform ranging between clusters of mobile devices, the first mobile device is a first representative mobile device in a first cluster of mobile devices, and wherein a cluster of mobile devices comprises at least two mobile devices, the program code including instructions to: receive a ranging signal broadcast by a second mobile device that is in a second cluster of mobile devices, wherein the second mobile device is a second representative mobile device in the second cluster of mobile devices and no other mobile device in the second cluster of mobile devices broadcasts a ranging signal; determine a distance between the first cluster of mobile devices and the second cluster of mobile devices based on the ranging signal received from the second representative mobile device in the second cluster of mobile devices; determine if the distance between the first cluster of mobile devices and the second cluster of mobile devices is greater than a predetermined threshold; and broadcast a ranging signal, wherein no other mobile device in the first cluster of mobile devices broadcasts a ranging signal when the distance between the first cluster of mobile devices and the second cluster of mobile devices is greater than the predetermined threshold.

BRIEF DESCRIPTION OF THE DRAWING

Non-limiting and non-exhaustive aspects are described with reference to the following figures, wherein like reference numerals refer to like parts throughout the various figures unless otherwise specified.

DETAILED DESCRIPTION

Figure 1:
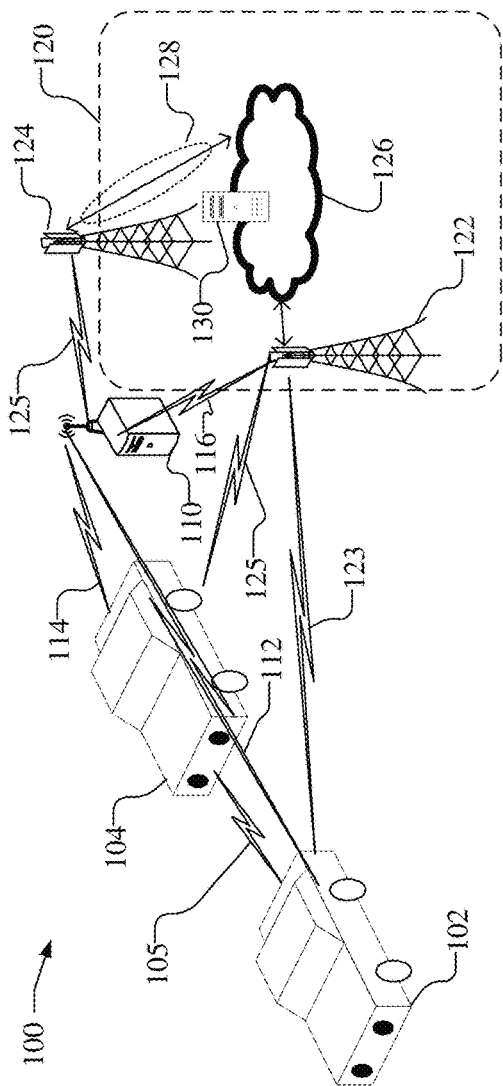
FIG. 1 illustrates a wireless communication system illustrating inter-vehicle communications, which may be used for vehicle platooning or clustering as described herein.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

A mobile devices may include wireless communication systems and positioning systems in order to accurately determine its position and to communicate that position to other entities, such as other mobile devices or servers. A mobile device, for example, may include semiautonomous or autonomous ground vehicle (e.g., automobile, truck, motorcycle, bicycle, robot, drone, etc.) or semiautonomous or autonomous aerial vehicle (e.g., UAV or drone), or a user held mobile device. For example, a vehicle may include a wireless communication system and positioning system, e.g., in a component or device, sometimes referred to as a user equipment (UE) or vehicle UE (V-UE), that provides wireless communication systems and positioning systems and that interfaces with a control system for the vehicle. The term mobile device may be used herein interchangeably with UE, V-UE or simply vehicle unless otherwise indicated.

Inter-device communications may be used, for example, for coordinated movement, such as automated driving and applications such as vehicle platooning. Inter-vehicle communications may be direct, e.g., vehicle to vehicle, or may be indirect, e.g., via an infrastructure component such as a roadside unit (RSU). The inter-vehicle communications may include messaged and information elements (IEs) with which a vehicle may provide information necessary for automated driving For example, one type of coordinated movement of mobile devices is sometimes referred to as platooning, in which mobile devices, such as semiautonomous or autonomous ground vehicle or semiautonomous or autonomous aerial vehicles travel together with relatively short distances between the vehicles. Vehicle platooning requires inter-device communications in order to maintain the relatively short distances between the devices while traveling together in a cluster at relatively high speed, e.g., highway speeds.

The vehicles within a platoon or cluster, for example, may use inter-vehicle communications to coordinate their relative positions within the cluster to maintain small distances between vehicles while traveling in the cluster. A lead vehicle, for example, may communicate with other vehicles within the platoon to coordinate braking and acceleration. In some instances, accurate knowledge of the relative positions of the vehicles within a cluster is desirable as the distances between vehicles may be small with respect to the braking distances of the vehicles for the speed at which the vehicles are traveling.

Various approaches may be used to derive the relative positions between vehicles within a cluster. For example, positions of each vehicle within a cluster may be derived using a satellite position system (SPS), such as the well-known Global Positioning Satellite (GPS) system or Global Navigation Satellite System (GNSS), which employ a number of satellites that are in orbit around the Earth.

In another example, relative positions of each vehicle within a cluster may be derived using ranging signaling for infrastructure or from vehicles. Ranging signals are sometimes referred to as physical ranging signals, positioning ranging signals, positioning reference signals, or physical referencing signals, and may be collectively referred to herein as PRS signals. Ranging signals may sometimes be referred to herein as physical ranging signals (PRS) or simply as ranging signals. Additional positioning techniques may be used, such as map fusion, e.g., to discard non-line of sight PRS signals.

PRS signals, for example, may be broadcast by vehicles within a cluster and received by other vehicles and/or infrastructure using direct communication systems, such as dedicated short-range communication (DSRC), cellular Vehicle-to-Everything (C-V2X) communication, and even 5G New Radio (NR) communications. PRS signals, are used to determine a range to the broadcasting vehicle, e.g., using round-trip-time (RTT) positioning operations, or other standard positioning operations such as time of arrival (TOA), time difference of arrival (TDOA) or observed time difference of arrival (OTDOA).

In general, for PRS-based positioning, all vehicles are required to broadcast PRS, so that all other vehicles may receive the broadcast PRS and determine the range to the broadcasting vehicle. Additionally, all vehicles broadcasting and receiving PRS may be required to be synchronized. Within a single cluster of vehicles, by way of example, there may be a number (N) of vehicles, e.g., 2 to 10 vehicles. Additionally, there may be multiple clusters (K). Accordingly, the number of PRS being broadcast by vehicles may be of order O(KN). Further, if each vehicle broadcasting and receiving PRS is required to be synchronized, the number of entities to be synchronized when there are K clusters each with N vehicles will be KN. This type of PRS signaling procedure may create a large overhead and is relatively inefficient. For example, in some circumstances, e.g., depending on vehicle locations and road layout, determining the distance between clusters (inter-cluster distance) may be more important than determining the distances between the vehicles within a cluster (intra-cluster distance).

In one implementation, to reduce overhead and increase positioning accuracy, a single designated vehicle, e.g., a center vehicle, within each cluster of vehicles may broadcast PRS to determine the inter-cluster distance, i.e., the distance between two or more clusters of vehicles. As long as the distance between clusters is large, PRS transmission may be limited to only the designated vehicle within each cluster. When the distance between clusters becomes small, e.g., less than a threshold, the designated vehicle may instruct each vehicle within its cluster to begin broadcasting PRS to determine intra-cluster distances, i.e., the distance between vehicles within each cluster, as well as the distances between vehicles in one cluster with respect to vehicles in another cluster. Thus, overhead due to PRS transmission may be greatly reduced, but high accuracy relative positioning between vehicles may be performed when necessary.

FIG. 1 illustrates a wireless communication system 100 illustrating mobile devices with inter-device communications, which may be used for platooning or clustering as described herein. The mobile devices in FIG. 1 are illustrates as vehicles, e.g., automobiles, by way of example. It should be understood, however, that embodiments described herein are not limited to cars, but may be used with any ground vehicle (e.g., automobile, truck, motorcycle, bicycle, robot, drone, etc.), aerial vehicle (e.g., plane, UAV, drone, etc), or any other appropriate mobile device and may include pedestrian or user held UEs. Wireless communication system 100, for example, illustrates a first vehicle 102 which includes a first wireless device, e.g., a vehicle user equipment (V-UE) 102, in wireless communications with a second wireless device in another V-UE in a second vehicle 104. The V-UEs in vehicle 102 and vehicle 104 may comprise, but are not limited to, an on board unit (OBU), a vehicle or subsystem thereof, or various other communication devices. The V-UEs function and provide communications on behalf of the vehicles 102 and 104 and, accordingly, may be sometimes referred to herein as vehicles 102 and 104 or mobile devices. The first vehicle 102 and second vehicle 104, for example, may be two vehicles within the same cluster, i.e., vehicle platoon, or in separate clusters, where other vehicles in the cluster(s) are not illustrated.

The wireless communication system 100 may use, e.g., Vehicle-to-Everything (V2X) communication standard, in which information is passed between a vehicle and other entities within the wireless communication network. The V2X services include, e.g., services for Vehicle-to-Vehicle (V2V), Vehicle-to-Pedestrian (V2P), Vehicle-to-Infrastructure (V2I), and Vehicle-to-Network (V2N). The V2X standard aims to develop autonomous or semi-autonomous driving systems, such as ADAS, which helps drivers with critical decisions, such as lane changes, speed changes, overtaking speeds, and may be used to assist in parking as discussed herein. Low latency communications are used in V2X and are therefore suitable for precise positioning. For example, current positioning techniques, such RTT, TOA, TDOA, or OTDOA may be used.

In general, there are two modes of operation for V2X services, as defined in Third Generation Partnership Project (3GPP) TS 23.285. One mode of operation uses direct wireless communications between V2X entities when the V2X entities. The other mode of operation uses network based wireless communication between entities. The two modes of operation may be combined, or other modes of operation may be used if desired.

As illustrated in FIG. 1, the wireless communication system 100 may operate using direct or indirect wireless communications between the vehicle 102 and vehicle 104. For example, the wireless communication may be over, e.g., Proximity-based Services (ProSe) Direction Communication (PC5) reference point as defined in 3GPP TS 23.303, and may use wireless communications under IEEE 1609, Wireless Access in Vehicular Environments (WAVE), Intelligent Transport Systems (ITS), and IEEE 802.11p, on the ITS band of 5.9 GHz, or other wireless connections directly between entities. Thus, as illustrated, vehicle 102 and vehicle 104 may directly communicate using with a Vehicle-to-Vehicle (V2V) communication link 105.

In other implementations, vehicle 102 and vehicle 104 may indirectly communicate, e.g., through a roadside unit (RSU) 110 via Vehicle-to-Infrastructure (V2I) communication links 112 and 114, respectively. The RSU 110, for example, may be a stationary infrastructure entity, that may support V2X applications and that can exchange messages with other entities supporting V2X applications. An RSU may be a logical entity that may combine V2X application logic with the functionality of base stations in a RAN, such as an eNB, ng-eNB, or eLTE (referred to as eNB-type RSU) or a gNB, or UE (referred to as UE-type RSU). The vehicles 102, 104 and RSU 106 may communicate with additional entities, such as additional vehicles, RSUs or pedestrians (not shown) using direct or indirect communication links. The RSU 110 may be capable of determining relative ranges of vehicles 102 and 104 using PRS broadcast by the vehicles 102 and 104.

During direct communications with one or more entities in the V2X wireless communication system 100, each entity may provide V2X information, such as an identifier for the V2X entity, as well as other information in messages such as Common Awareness Messages (CAM) and Decentralized Notification Messages (DENM) or Basic Safety Message (BSM), which may be used for, e.g., Advanced Driver Assistance System (ADAS) or safety use cases.

Additionally, as illustrated in FIG. 1, the wireless communication system 100 may operate using indirect wireless communications, e.g., using cellular vehicle-to-everything (CV2X). For example, vehicles may communicate via a base station 122 in a Radio Access Network (RAN), such as an evolved Node B (eNB) or next generation evolved Node B (ng-eNB) in LTE wireless access and/or evolved LTE (eLTE) wireless access or a NR Node B (gNB) in Fifth Generation (5G) wireless access. Thus, as illustrated, the vehicles 102 and 104 may wirelessly communicate with a base station 122 in the network infrastructure 120, via communication links 123 and 125. In some implementations, the base station 122 may directly communicate with the RSU 110 via communication link 116. The base station 122 may also communicate with other base stations 124 through the IP layer 126 and network 128, such as an Evolved Multimedia Broadcast Multicast Services (eM-BMS)/Single Cell Point To Multipoint (SC-PTM) network. A V2X application server 130 may be part of or connected to the IP layer 126 and may receive and route information between the V2X entities as well as receive other external inputs. The base station 124 may wirelessly communicate with the other V2X entities, such as the RSU 110 via communication link 127 or vehicles 102 and 104 via communication links (not shown).

Vehicles 102 and 104 may broadcast PRS on links 105, 112, 114, 123 or 125, with which the range or relative positions between vehicles 102 and 104 may be determined. The PRS broadcast by vehicles 102 and 104 may be any signal suitable for ranging, e.g., as defined for DSRC or C-V2X. In some implementations, the PRS may be broadcast on unlicensed spectrum, such as one or more Unlicensed National Information Infrastructure (UNII) radio bands including, for example, one or more of the UNII-1 radio band, the UNII-2A radio band, the UNII-2B radio band, or the UNII-3 radio band. When broadcast on unlicensed spectrum, listen before transmit (LBT) protocols may be employed. For example, the designated vehicle or the leading vehicle may reserve time slots for PRS transmissions from itself and its followers. The vehicles may then do a group-based LBT on the UNI-III spectrum. For example, where vehicles 102 and 104 broadcast PRS in a V2V link 105, the range or relative positions between vehicles 102 and 104 may be determined directly, e.g., using RTT or other appropriate positioning techniques. On the other hand, where vehicles 102 and 104 broadcast PRS in V2I links 112 and 114 or via links 123 and 125, the range or relative positions between vehicles 102 and 104 may be determined indirectly based on the range or relative positions between vehicle 102 and RSU 110 (or base station 122) and the range or relative positions between vehicle 104 and RSU 110 (or base station 122), which may be determined using RTT or other appropriate positioning techniques.

The V2V communications based on direct wireless communications between the vehicles 102 and 104, do not require any network infrastructure and enable low latency communications, which is advantageous for precise positioning. Accordingly, such direct wireless V2V communications may be desirable for intra-cluster positioning, whereas inter-cluster positioning, which typically involves much greater distances and thus, more relaxed latency requirements, may be able to utilize the vehicle to vehicle signaling via V2V link 105 as well as the vehicle to infrastructure signaling via links 112 and 114 or via links 123 and 125.

Figure 2:
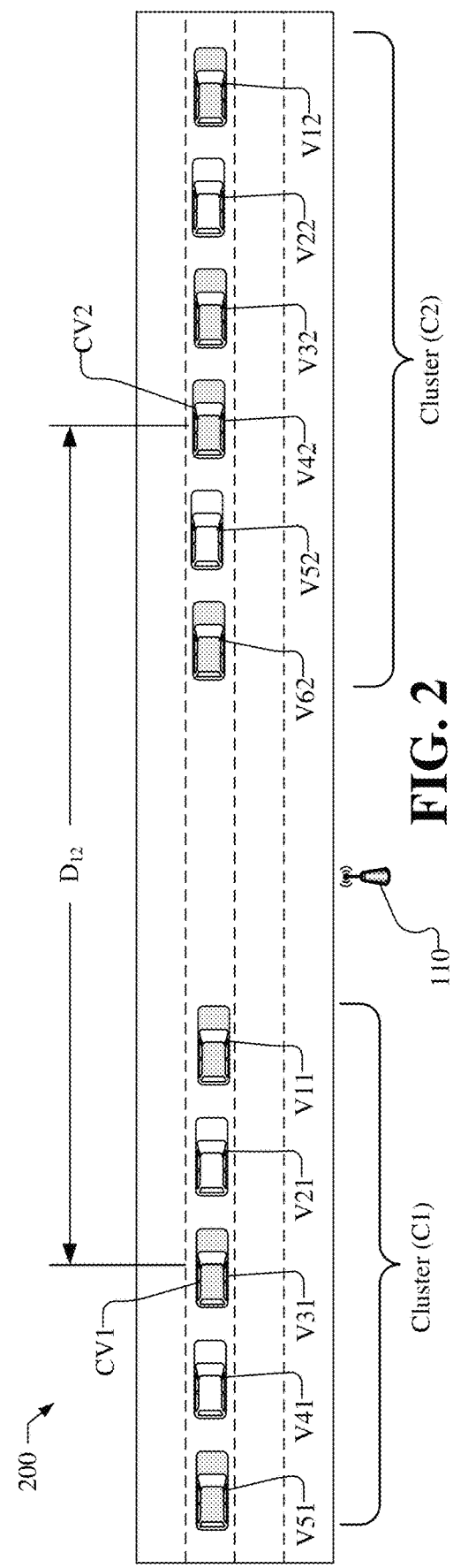
FIG. 2 illustrates an environment in which multiple clusters of vehicles are traveling along the same road.

FIG. 2 illustrates an environment 200 in which multiple clusters of vehicles are traveling along the same road. There may be a number K of clusters, and thus, clusters may be denoted by CK, where K=1, 2, . . . n, i.e., clusters C1, C2, . . . Cn. Moreover, within a cluster K, there are a number N of vehicles, where N=1, 2, . . . m, where each vehicle may be denoted based on its number N and its cluster K, as VNK. Thus, FIG. 2 illustrates a first cluster C1 and an independent second cluster C2 of vehicles. The clusters may be formed, for example, by arbitrarily clustering vehicles base on their locational proximity.

FIG. 2 further illustrates five vehicles within cluster C1, denoted as vehicles V11, V21, V31, V41, and V51. FIG. 2 further illustrates six vehicles in cluster C2, denoted as vehicles V12, V22, V32, V42, V52, and V62. It should be understood that there may be additional clusters and that each cluster may include fewer or additional vehicles. By way of example, a cluster of vehicles may have 2 or more vehicles, and generally had up to 10 vehicles, but additional vehicles are possible.

As discussed above, if all vehicles in both clusters were required to broadcast PRS for PRS positioning, a large number of PRS would be broadcast, e.g., on the order of O(KN). Further, if each vehicle broadcasting and receiving PRS is required to be synchronized, the number of entities to be synchronized when there are K clusters each with N vehicles would be KN. Such a PRS signaling procedure may create a large overhead and may be inefficient. For example, if the clusters C1 and C2 are relatively far apart and no other road conditions require PRS positioning, broadcasting PRS signals from each vehicle in each cluster would be unnecessary.

Nevertheless, even if the clusters C1 and C2 are far apart, it may still be necessary to determine and monitor the relative positions of the separate clusters to ensure safety. For example, the clusters C1 and C2 are independent of each other and independently control their own velocities, acceleration and deceleration, e.g., based on signals from a lead vehicle, e.g., vehicle V11 in cluster C1 and vehicle V12 in cluster C2, on-board sensors on the vehicles (e.g., radar), etc. Without knowledge of the other cluster's relative position, however, one cluster may inadvertently collide with another cluster.

Thus, in one implementation, a single vehicle within each cluster may be designated to represent the cluster and broadcast PRS on behalf of the cluster to determine inter-cluster distances, i.e., the distance between two or more clusters of vehicles, while the remaining vehicles in the clusters do not broadcast PRS. The distances between vehicles within the cluster, i.e., the intra-cluster distance, may be controlled using other non-PRS related techniques. This may be particularly appropriate for periods, e.g., where road and traffic conditions are stable and do not require frequent adjustments. By way of example, during periods when only the representative vehicle broadcasts PRS on behalf of the cluster, the distances between vehicles within a cluster may be controlled based on signals provided from a lead vehicle to match velocities, acceleration, and deceleration. The lead vehicle may be the same vehicle or a different vehicle than the vehicle designated to represent the cluster for inter-cluster distance determination. The distances between vehicles within the cluster may be controlled using additional or alternative techniques, such as the use of sensors on each vehicle, such as radar, lidar, cameras, etc.

By way of example, the representative vehicle may be designated based on geometric position of the vehicle within the cluster, e.g., a center vehicle, such as vehicle V31 in cluster C1 and vehicle V42 in cluster C2. If desired, other vehicle positions within the cluster may be designated as the representative vehicle, such as the lead vehicles, e.g., V11 and V12 in respective clusters C1 and C2. In another implementation, the representative vehicle may be designated based on signal power, e.g., the vehicle with the highest signal power. The representative vehicle for the cluster may be designated at the time of formation of the cluster and in some implementations may persist until the cluster is dissolution of the cluster. For sake of reference, the representative vehicle for each cluster will be identified as the center vehicle, whether selection was based on geometric position or other factors such as signal power. The representative vehicle (center vehicle) in each cluster K may be denoted CVK, for example, vehicle V31 may be denoted CV1 and vehicle V42 may be denoted CV2.

The center vehicles CV1 and CV2 broadcast and receive PRS on behalf of their respective clusters, along with any additional messages that may be necessary to derive the inter-cluster range, illustrated as distance D12 in FIG. 2. The broadcast PRS from one center vehicle, e.g., CV1, may be received directly, e.g., in a V2V link, by the center vehicle in the other cluster, e.g., center vehicle CV2. The center vehicles may use the broadcast PRS to determine the inter-cluster range using known ranging techniques. For example, PRS are broadcast from the center vehicles CV1 and CV2 in both clusters. The timing information of the PRS broadcasts and their relative location may be transmitted afterward the PRS broadcast from both center vehicles CV1 and CV2. Furthermore, the time-of-arrival of received PRS may be transmitted back to the broadcasting entity, from which the broadcasting entity may determine the range. By way of example, the center vehicles CV1 and CV2 may agree to perform ranging using PRS signals together. Center vehicle CV1 may broadcast PRS and center vehicle CV2 may broadcast PRS. Center vehicle CV1 may broadcast an ITS message that may include, e.g., the CV1 PRS broadcast time and/or location, and a reception time of the PRS from center vehicle CV2. Similarly, center vehicle CV2 may broadcast an ITS message that may include, e.g., the CV2 PRS broadcast time and/or location, and a reception time of the PRS from center vehicle CV1. Based on the time of transmission of the PRS and the time of arrival of the PRS from the other center vehicle, each of the center vehicles CV1 and CV2 may then determine the range between the center vehicles CV1 and CV2 based on the round trip time. Other ranging or positioning techniques, such as TDOA may be used if desired. For example, if more than two clusters are present, or if an infrastructure entity such an RSU 110 transmits or receives PRS, TDOA may be computed, e.g., based on indications of the time of transmissions of PRS from each broadcasting entity and the time of arrival of other's PRS, and the range may then be determined from the TDOA. If the representative vehicles know roughly the locations of other representative vehicles, e.g., from a broadcast ITS message, absolute positioning may be performed using the TDOA or ranges.

Alternatively, the broadcast PRS from both center vehicles CV1 and CV2 may be received by the RSU 110, which may determine the range between RSU 110 to each cluster C1 and C2 using known ranging techniques, e.g., RTT or TDOA, from which the inter-cluster range between clusters C1 and C2 may be determined and provided to the center vehicles CV1 and CV2 via V2I links.

Thus, the center vehicle (or other representative vehicle) for each cluster obtains the inter-cluster distance with respect to other center vehicles (or other representative vehicles). The inter-cluster distances may be saved and stored at each cluster center vehicle CV1 and CV2. The cluster center vehicles CV1 and CV2 additionally know and maintain basic information about their respective clusters C1 and C2. For example, the basic information about each cluster may include, e.g., the speed, length, the number of vehicles, the velocity, the location, direction of travel, etc. The center vehicles CV1 and CV2 may additionally transmit, e.g., via V2V or V2I links, the basic information about their respective cluster and receive and store the basic information about the other clusters, such as the speed, length, the number of vehicles, the velocity, the location, direction of travel, etc.

The distance $D_{12}$ between center vehicles CV1 and CV2 may be treated as the inter-cluster distance for clusters C1 and C2, which is valid approximation particularly when the distance $D_{12}$ is large. If the inter-cluster distance $D_{12}$ between clusters C1 and C2 (as determined from the PRS broadcast by center vehicles CV1 and CV2) is greater than a predetermined threshold, the PRS will continue to be broadcast by only the center vehicles CV1 and CV2. If the inter-cluster distance $D_{12}$ between clusters C1 and C2 falls below the predetermined threshold, then each vehicle within each cluster will begin broadcasting PRS signals and determining distances between other vehicles within its cluster, e.g., intra-cluster distances, as well as distances to vehicles in the other cluster. For example, if the inter-cluster distance $D_{12}$ between clusters C1 and C2 falls below the predetermined threshold, the center vehicles CV1 and CV2 may transmits signals to the other vehicles within their respective clusters C1 and C2 instructing the vehicles to being broadcasting PRS. The PRS broadcast by each vehicle may be received directly by the other vehicles, e.g., in a V2V link, and each vehicle may determine the intra-cluster range using known ranging techniques, such as RTT. Because PRS broadcast is triggered due to proximity to another cluster and velocity, acceleration, and/or deceleration adjustments are likely to occur, low latency positioning is desirable, and accordingly, use of RSU 110 (or C-V2X communication) may not be appropriate.

The predetermined threshold, for example, may be a predetermined static threshold, such as X meters, which is large enough to ensure that the largest permitted clusters will not inadvertently collide. Alternatively, the predetermined threshold may vary as a function of, e.g., the length and/or velocity of one or more of the clusters, as known and stored in the center vehicles CV1 and CV2. For example, center vehicle CV1 may know the approximate length of cluster C1, based on the number of vehicles in the cluster and distances between each vehicle. Center vehicle CV1 may set the predetermined threshold based on a length of the cluster C1, e.g., two times the length, three times the length, or generally × times the length. Additionally, center vehicle CV1 may further adjust the predetermined threshold based on the velocity of the cluster C1, e.g., by increasing the predetermined threshold as velocity increases. Additionally, center vehicle CV1 may adjust the predetermined threshold based on the history of the inter-cluster distances stored at the center vehicle CV1. For example, if the rate of decrease in the inter-cluster distances is large, e.g., above a threshold, the center vehicle CV1 may increase the predetermined threshold.

If the center vehicle CV1 has received and stored basic information about the other cluster C2, such as length, number of vehicles, etc., the predetermined threshold generated by center vehicle CV1 may also be based on the basic information about the other cluster C2. For example, the predetermined threshold may be based on the sum of the lengths of clusters C1 and C2, e.g., half of the sum of the lengths of C1 and C2 plus a buffer distance. Additionally, the center vehicle CV1 may further adjust the predetermined threshold based on the velocity of the other cluster C2.

In some implementations, a center vehicle, e.g., center vehicle CV1, may instruct the vehicles within cluster C1 to being broadcasting PRS if the center vehicle determines that vehicles in the other cluster C2 have been instructed to broadcast PRS. For example, the center vehicle CV2 for cluster C2 may transmit a signal instructing the vehicles in cluster C2 to begin broadcasting PRS, which may be received by center vehicle CV1. In response, center vehicle CV1 for cluster C1 may also transmit a signal instructing the vehicles in cluster C1 to begin broadcasting PRS. Alternatively, center vehicle CV1 for cluster C1 may detect multiple vehicles in cluster C2 broadcasting PRS and in response may transmit a signal instructing the vehicles in cluster C1 to begin broadcasting PRS.

Figure 3:
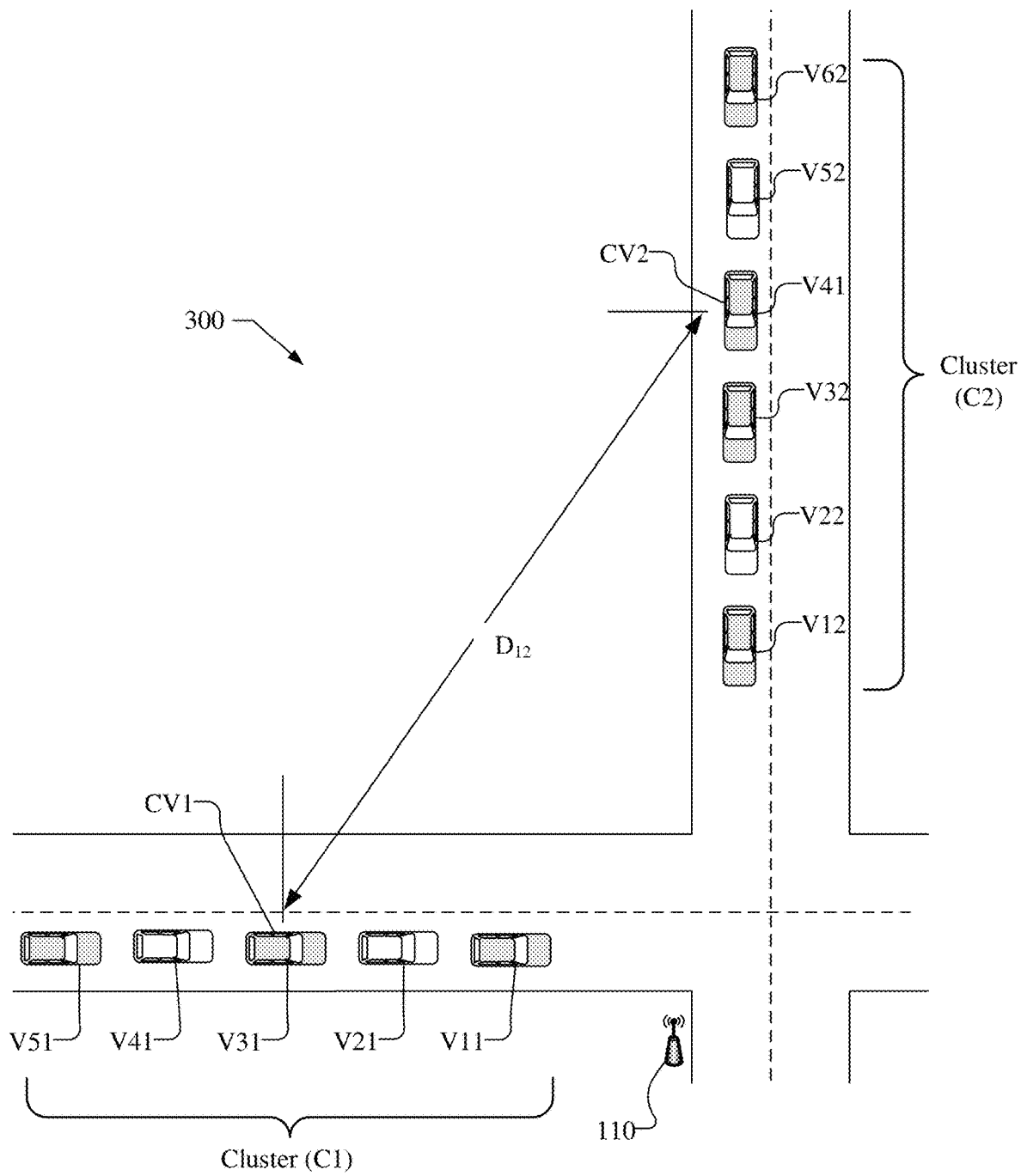
FIG. 3 illustrates an environment in which multiple clusters of vehicles are traveling along different roads that intersect.

FIG. 3 illustrates an environment 300 in which vehicle clusters C1 and C2 are approaching an intersection. As illustrated, the clusters C1 and C2 may be traveling on different roads, but due to the intersection of the roads, the clusters C1 and C2 may collide. Accordingly, knowledge of the location of one cluster with respect to the other is important for safety considerations. It should be understood that while FIG. 3 illustrates a four-way intersection, there are other types of road designs in which it is desirable to know the relative positions or ranges between clusters C1 and C2, such as the merger of two highways.

As discussed above, the representative vehicles for each cluster, e.g., vehicles CV1 and CV2 may broadcast PRS in order to determine the distance between the clusters C1 and C2, while the remaining vehicles in the clusters do not broadcast PRS. When the inter-cluster distance D12 falls below a predetermined threshold, the vehicles within the clusters C1 and C2 may begin to broadcast PRS for determining distances between individual vehicles. As can be seen in FIG. 3, however, because the clusters C1 and C2 are not traveling in the same direction on the same road, the predetermined threshold may need to be adjusted accordingly. Thus, for example, the center vehicles may generate the predetermined threshold based on the relative directions of travel of the clusters, which may be included in the basic information transmitted to and received from other clusters, e.g., via V2V or V2I links.

By broadcasting PRS from only representative vehicles in a cluster of vehicles for inter-cluster ranging until the distance is less than a predetermined threshold, at which time all vehicles in the cluster broadcast PRS, the overhead due to PRS may be greatly reduced until the need for accurate ranging warrants the increase in overhead. Moreover, by broadcasting from only the representative vehicles, power savings may be achieved and there will be fewer PRS broadcast and thus there will less interference in the PRS spectrum. Accordingly, if PRS using LBT is used, entities will be able to broadcast their PRS within a time window more effectively. Further, improved efficiency is achieved as only a single entity maintains and updates cluster information, efficiency. Latency may be significantly reduced as PRS exchanges occur between only the representative vehicles. Latency is may also be significantly reduced when PRS is implemented in unlicensed spectrum with LBT protocol.

Figure 4:
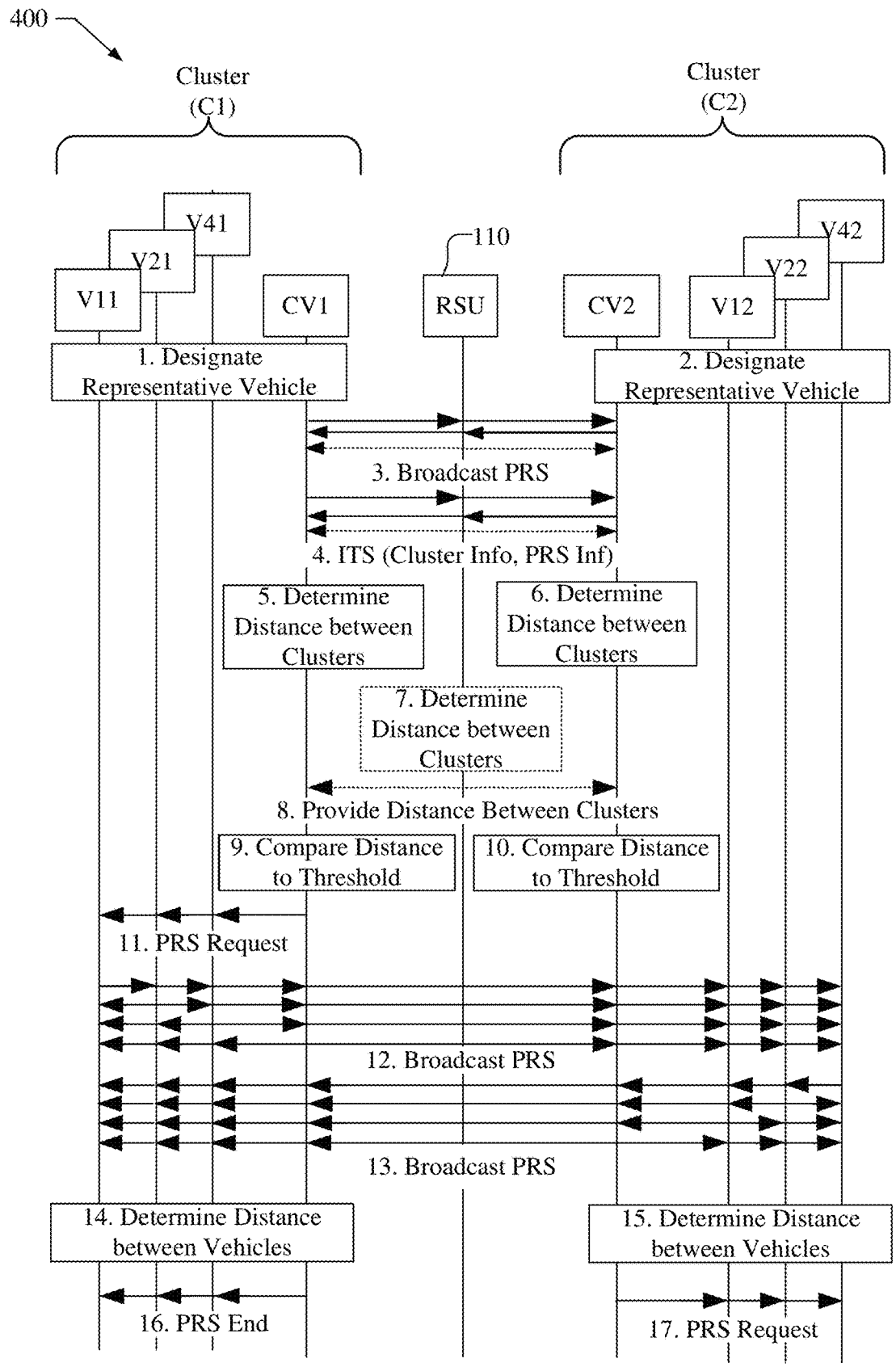
FIG. 4 is a signal flow illustrating an example of an inter-vehicle message exchange for inter-cluster distance and intra-cluster distance determination.

FIG. 4 is a signal flow 400 illustrating an example of an inter-vehicle message exchange for inter-cluster distance and intra-cluster distance determination. FIG. 4 illustrates cluster C1 as including vehicles V11, V21, V41, and a center vehicle CV1 (center vehicle CV1 may be vehicle V31 in cluster C1), and cluster C2 as including vehicles V12, V22, V42, and a center vehicle CV2 (center vehicle CV2 may be vehicle V32 in cluster C2), and RSU 110. It should be understood that additional or fewer vehicles may be included in each cluster. Moreover, other types of infrastructure besides RSU 110 may be present, such as a network base station as illustrated in FIG. 1.

At stages 1 and 2, a representative vehicle is designated for cluster C1 and cluster C2, respectively. The representative vehicle for each cluster may be designated based on the position of the vehicle within the cluster, e.g., center vehicle, or other factors, such as signal power, and is represented in FIG. 4 as vehicle CV1 in cluster C1 and vehicle CV2 in cluster C2.

At stage 3, vehicles CV1 and CV2 broadcast PRS, which is received by the other vehicle, and in some implementations, by other entities, such as RSU 110. For example, vehicle CV1 in cluster C1 broadcasts PRS, which is received by vehicle CV2 in cluster C2 and vehicle CV2 in cluster C2 broadcasts PRS, which is received by vehicle CV1 in cluster C1. The PRS may be broadcast by vehicles CV1 and CV2 according to reserved time slots for PRS transmissions and group-based LBT on the UNI-III spectrum. The broadcast PRS may be received directly, e.g., in a V2V link. In some implementations, the PRS broadcast may be received by an infrastructure entity, such as RSU 110. In some implementations, as illustrated with dotted lines, the RSU 110 may broadcast PRS that is received by the vehicles CV1 and CV2. In some implementations, additional messaging may be transmitted prior to the broadcast of PRS in stage 3, such as a PRS request message transmitted from an initiator center vehicle, e.g., CV1, to responder center vehicles, e.g., CV2, to request exchange of PRS signals, and a PRS acknowledge message from the responder center vehicles, e.g., CV2, to the initiator CV1, to acknowledge the request for PRS signals.

At stage 4, vehicles CV1 and CV2 may broadcast information about their respective clusters and PRS information, e.g., in an ITS message. For example, vehicle CV1 may broadcast information related to the PRS broadcast by vehicle CV1, such as the time of departure (ToD) and/or location of the vehicle CV1, and information related to the PRS received from vehicle CV2, such as time of arrival (ToA), and vehicle CV2 may similarly broadcast information related to the PRS broadcast by vehicle CV2, such as the ToD and/or location of the vehicle CV2, and information related to the PRS received from vehicle CV1, such as the ToA. Additionally, vehicle CV1 may broadcast cluster information about the cluster C1 and vehicle CV2 may broadcast cluster information about the cluster C2. The cluster information and/or the PRS information may be used by the other vehicles, e.g., for obtaining a range between clusters C1 and C2 and generating a predetermined threshold. For example, the cluster information may include one or more of the speed, length, the number of vehicles, the velocity, the direction of travel, the location of cluster C1, etc. In some implementations, the cluster and PRS information may be received by an infrastructure entity, such as RSU 110. In some implementations, as illustrated with dotted lines, the RSU 110 may broadcast PRS information, such as time of arrival of PRS received from vehicles CV1 and CV2, and time of transmission and possibly location of the RSU if the RSU 110 broadcast PRS in stage 3.

At stage 5, vehicle CV1 may use the PRS broadcast and received to determine the distance between cluster C1 and cluster C2, e.g., based on the transmission times of the PRS and time of arrivals of the PRS as stored by vehicle CV1 and received from vehicle CV2 using RTT or other appropriate ranging or positioning techniques. For example, the range may be determined based on the ToD of the broadcast PRS and the ToA of the received PRS. The RTT, for example, between CV1 and CV2 may be determined based on the $ToD_i$ and $ToA_i$ for the $PRS_i$ signals (where i=1 for PRS broadcast from CV1 and i=2 for PRS broadcast by CV2), as the difference between the $ToD_1$ and $ToA_2$ minus the difference between the $ToA_1$ and the $ToD_2$, e.g., as follows:

$$RTT = (ToD_1 - ToA_2) - (ToA_1 - ToD_2) \qquad \text{eq. 1}$$

The RTT value is the round-trip time for the signal, and thus, the range (distance) between CV1 and CV2 may be determined as RTT/2c, where c is the speed of light. Other ranging techniques may be used if desired, such as single sided ranging, TDOA, etc. The vehicle CV1 may store the determined distance.

At stage 6, vehicle CV2 may use the PRS broadcast and broadcast to determine the distance between cluster C2 and cluster C1, in a manner similar to that discussed in stage 5, and may store the determined distance.

At stages 7 and 8, if the RSU 110 received the PRS broadcasts from vehicles CV1 and CV2 in stages 3 and 4, the RSU 110 may determine the distance between the RSU 110 and each cluster C1 and C2, e.g., based on the time of transmission of the PRS signals as received from the vehicles CV1 and CV2 and the time of arrival at the RSU 110, using RTT, single sided ranging, TDOA, or other appropriate ranging or positioning techniques, from which the distance between clusters C1 and C2 may be determined. The RSU 110 may provide the determined distance between clusters C1 and C2 to the vehicles CV1 and CV2 in stage 8.

At stage 9, vehicle CV1 may determine whether the inter-cluster distance between clusters C1 and C2 is greater than a predetermined threshold. The vehicle CV1, for example, may use a static predetermined threshold or may generate the predetermined threshold based on information for cluster C1, such as one or more of the speed, length, the number of vehicles, the velocity, the location of cluster C1. The vehicle CV1 may further generate the predetermined threshold based on information for cluster C2, if received at stage 4, such as one or more of the speed, length, the number of vehicles, the velocity, the location of cluster C2. The vehicle CV1 may further generate the predetermined threshold based on relative information for clusters C1 and C2, such as the relative directions of travel of the clusters and/or stored history of inter-cluster distances, e.g., the rate of change in the determined distances. If the inter-cluster distance between clusters C1 and C2 is greater than the predetermined threshold, vehicle CV1 may continue to broadcast PRS and stages 3-9 are repeated until the inter-cluster distance between clusters C1 and C2 is less than the predetermined threshold.

At stage 10, vehicle CV2 may determine whether the inter-cluster distance between clusters C2 and C1 is greater than a predetermined threshold. The vehicle CV2, for example, may use a static predetermined threshold or may generate the predetermined threshold based on information for cluster C2, such as one or more of the speed, length, the number of vehicles, the velocity, the location of cluster C2. The vehicle CV2 may further generate the predetermined threshold based on information for cluster C1, if received at stage 3, such as one or more of the speed, length, the number of vehicles, the velocity, the location of cluster C1. The vehicle CV2 may further generate the predetermined threshold based on relative information for clusters C2 and C1, such as the relative directions of travel of the clusters and/or stored history of inter-cluster distances. If the inter-cluster distance between clusters C2 and C1 is greater than the predetermined threshold, vehicle CV2 may continue to broadcast PRS and stages 4-10 are repeated until the inter-cluster distance between clusters C2 and C1 is less than the predetermined threshold.

At stage 11, in response to determining that the inter-cluster distance between clusters C1 and C2 is less than the predetermined threshold at stage 9, the vehicle CV1 may transmit a PRS request message to vehicles V11, V21, and V41 instructing them to begin broadcasting PRS signal. As illustrated in FIG. 4, vehicle CV2 may not transmit a signal to vehicles V12, V22, and V42 instructing them to begin broadcasting PRS signal if vehicle CV2 did not determine that the inter-cluster distance between clusters C2 and C1 is less than the predetermined threshold at stage 10, which may occur if vehicles CV1 and CV2 are using different predetermined thresholds.

At stage 12, vehicles V11, V21, V41 and CV1 in cluster C1 begin to broadcast PRS, which is received by the other vehicles in cluster C1 and may be received by vehicles in cluster C2, via a direct link, such as V2V link.

At stage 13, vehicles V12, V22, V42 and CV2 in cluster C2 begin to broadcast PRS, which is received by the other vehicles in cluster C2 and may be received by vehicles in cluster C1, via a direct link, such as V2V link. By way of example, vehicles V12, V22, V42 and CV2 in cluster C2 may begin to broadcast PRS in response to receiving the PRS broadcast from vehicles in cluster C1. In some implementations, vehicle CV2 may receive the broadcast PRS from vehicles in cluster 1 and in response may send a PRS request message to vehicles in cluster C2. In some implementations, vehicle CV2 may receive the PRS request message from vehicle CV1 in stage 11 and in response may send a PRS request message to vehicles in cluster 2. After transmission of the broadcast PRS in stages 12 and 13, PRS information for broadcast and/or received PRS may also be transmitted by vehicles in clusters C1 and C2, e.g., in ITS messages.

At stage 14, each vehicle in cluster C1 determines the distance between itself and other vehicles in cluster C1, e.g., using RTT or other appropriate ranging or positioning techniques. In some implementations, each vehicle in cluster C1 may also determine the distance between itself and vehicles in cluster C2, e.g., using RTT or other appropriate ranging or positioning techniques, if broadcast PRS is received from vehicles in cluster C2 as illustrated in stage 13. Stages 12-14 may be repeated until vehicle CV1 determines the distance between itself and vehicle CV2, and thus, the inter-cluster distance between clusters CV1 and CV2 is again greater than the predetermined threshold.

At stage 15, each vehicle in cluster C2 determines the distance between itself and other vehicles in cluster C2, e.g., using RTT or other appropriate ranging or positioning techniques. In some implementations, each vehicle in cluster C2 may also determine the distance between itself and vehicles in cluster C1, e.g., using RTT or other appropriate ranging or positioning techniques, if broadcast PRS is received from vehicles in cluster C1 as illustrated in stage 12. Stages 12-15 may be repeated until vehicle CV2 determines the distance between itself and vehicle CV1, and thus, the inter-cluster distance between clusters CV2 and CV1 is again greater than the predetermined threshold.

At stage 16, in response to determining that the distance between vehicle CV1 and vehicle CV2, and thus, the inter-cluster distance between clusters CV1 and CV2 is greater than the predetermined threshold, vehicle CV1 may transmit a PRS end message to vehicles V11, V21, and V41 instructing them to end broadcasting PRS signals, and stages 3-9 are then performed.

At stage 17, in response to determining that the distance between vehicle CV2 and vehicle CV1, and thus, the inter-cluster distance between clusters CV2 and CV1 is greater than the predetermined threshold, vehicle CV2 may transmit a PRS end message to vehicles V12, V22, and V42 instructing them to end broadcasting PRS signals, and stages 3-10 are then performed.

Figure 5:
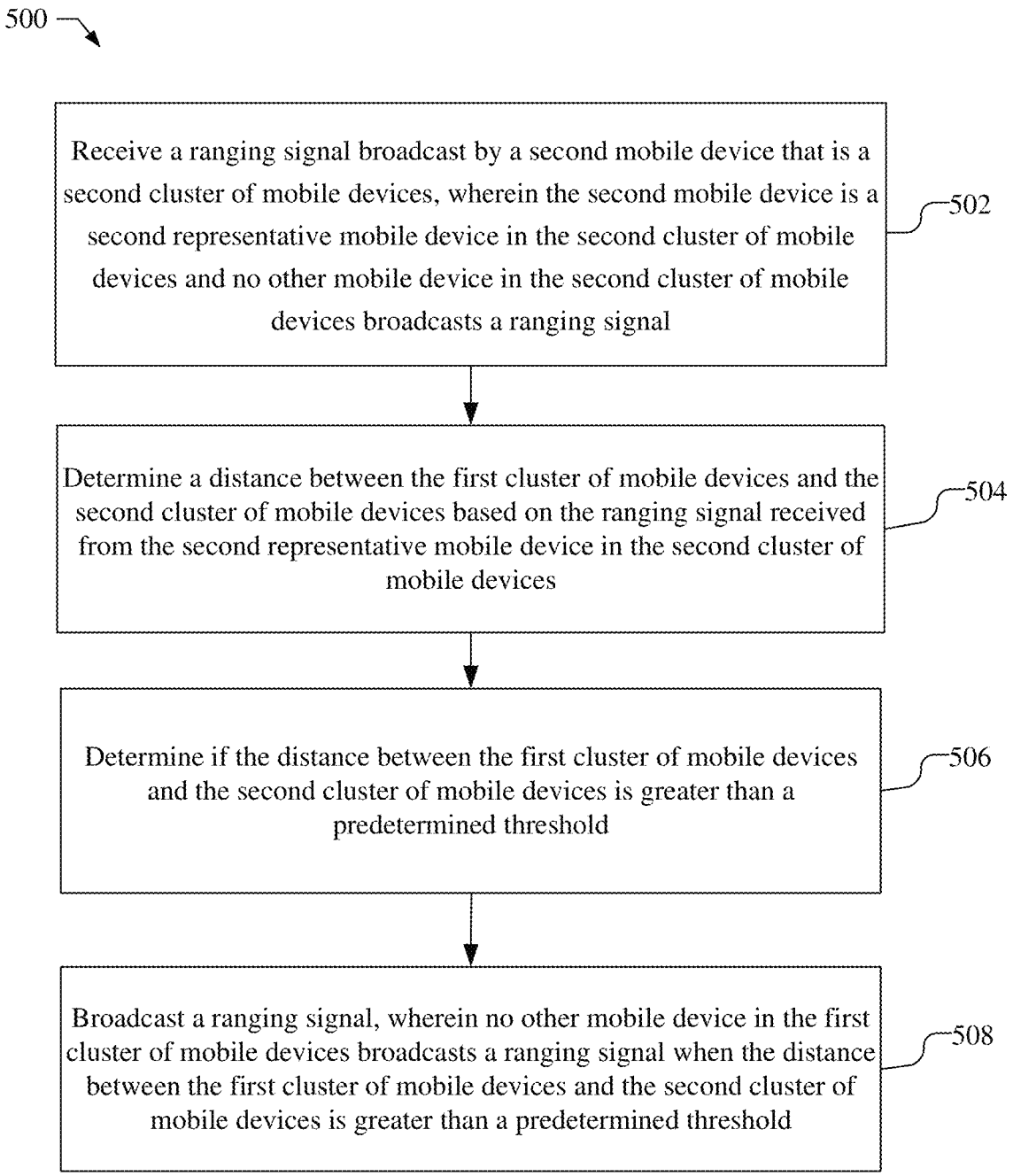
FIG. 5 is a flow chart illustrating ranging between clusters of vehicles performed by a device in a representative vehicle of a cluster of vehicles.

FIG. 5 is a flow chart 500 illustrating ranging between clusters of mobile devices performed by a first mobile device that is in a first cluster of mobile devices, wherein the first mobile device is a first representative mobile device in the first cluster of mobile devices. As discussed above, the mobile devices may be part of or included in semiautonomous or autonomous ground or aerial vehicles, such as automobiles, trucks, motorcycles, bicycles, robots, drones, UAVs or pedestrian held UEs.

At block 502, a ranging signal broadcast by a second mobile device that is a second cluster of mobile devices is received, e.g., as discussed at stage 3 of FIG. 4. The second mobile device is a second representative mobile device in the second cluster of mobile devices and no other mobile device in the second cluster of mobile devices broadcasts a ranging signal. The ranging signal, for example, may be a PRS and may be received directly from the second mobile device or via an intervening entity, as described herein.

At block 504, a distance between the first cluster of mobile devices and the second cluster of mobile devices is determined based on the ranging signal received from the second representative mobile device in the second cluster of mobile devices, e.g., as discussed at stage 5 of FIG. 4. The distance, for example, may be determined based on a round trip tip (RTT) determined, e.g., using the time of arrival of the ranging signal, as well as the transmission time of the ranging signal, and a time of transmission and a time of arrival at the second mobile device of a ranging signal transmitted by the first mobile device.

At block 506, the first mobile device determines if the distance between the first cluster of mobile devices and the second cluster of mobile devices is greater than a predetermined threshold, e.g., as discussed at stage 9 of FIG. 4. The predetermined threshold may be a static threshold or may be a varying threshold based on cluster related parameters, such as speed, number of mobile devices, etc.

At block 508, the first mobile device broadcasts a ranging signal, wherein no other mobile device in the first cluster of mobile devices broadcasts a ranging signal when the distance between the first cluster of mobile devices and the second cluster of mobile devices is greater than a predetermined threshold, e.g., as discussed at stages 3 and 9 of FIG. 4. For example, if the distance is greater than the predetermined threshold, the process may repeat until the distance is no longer greater than the predetermined threshold.

In some implementations, the first mobile device may transmit a signal to the other mobile devices in the first cluster of mobile devices to begin broadcasting ranging signals when the distance between the first cluster of mobile devices and the second cluster of mobile devices is less than the predetermined threshold, e.g., as discussed at stage 11 of FIG. 4.

In some implementations, the predetermined threshold may be generated based on cluster information for the first cluster of mobile devices, wherein the cluster information for the first cluster of mobile devices comprises one or more of a length, speed, number of members, velocity, or a combination thereof, e.g., as discussed at stage 9 of FIG. 4.

In some implementations, the first mobile device may receive cluster information for the second cluster of mobile devices from the second representative mobile device, wherein the cluster information for the second cluster of mobile devices comprises one or more of a size, speed, number of members, velocity, or a combination thereof, e.g., as discussed at stage 4 of FIG. 4. The predetermined threshold may be generated based on the cluster information for the second cluster of mobile devices and cluster information for the first cluster of mobile devices, e.g., as discussed at stage 9 of FIG. 4.

In some implementations, the first mobile device may store determined distances between the first cluster of mobile devices and the second cluster of mobile devices, e.g., as discussed at stage 5 of FIG. 4. The predetermined threshold may be generated based at least partially on stored determined distances, as discussed at stage 9 of FIG. 4.

In some implementations, the first mobile device may broadcast cluster information for the first cluster of mobile devices with the ranging signal, wherein the cluster information for the first cluster of mobile devices comprises one or more of a length, speed, number of members, velocity, or a combination thereof, e.g., as discussed at stage 3 of FIG. 4.

In some implementations, the first mobile device may be designated as the first representative mobile device based on the first mobile device based on a geometric position of the first mobile device in the first cluster of mobile devices, e.g., as discussed at stage 1 of FIG. 4.

Figure 6:
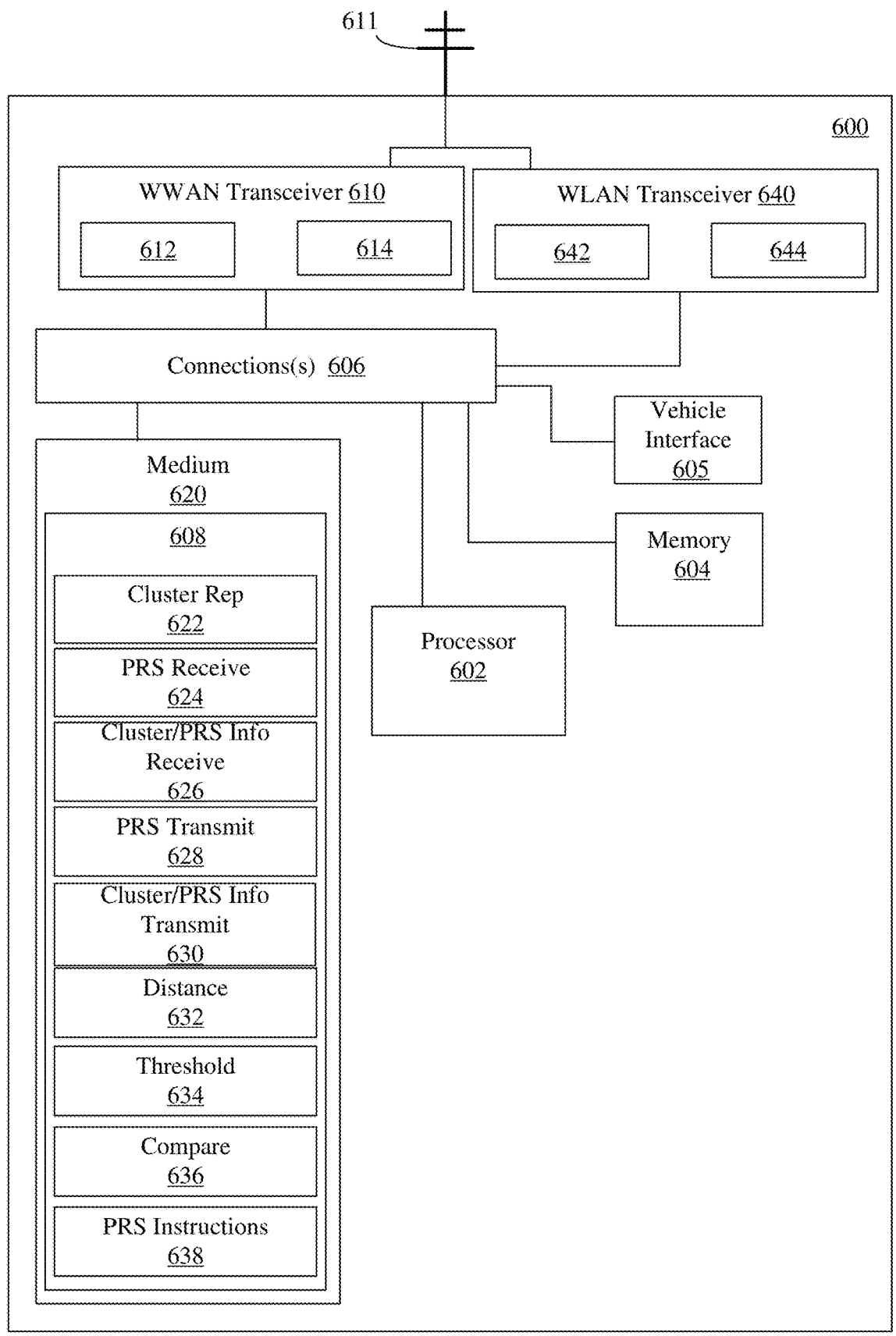
FIG. 6 is a diagram illustrating an example of a hardware implementation of a user equipment (UE) for a vehicle capable of inter-cluster distance and intra-cluster distance determination.

FIG. 6 shows a schematic block diagram illustrating certain exemplary features of mobile device 600, which may be, e.g., a vehicle user equipment (V-UE) in a vehicle or a pedestrian or user held UE, such as described in reference to FIGS. 1-5. The mobile device 600 may be configured to control the automated guidance, e.g., driving of a vehicle 102, including joining and traveling in a cluster of vehicles or vehicle platoon, e.g., shown in FIGS. 1-3, and may include a vehicle interface 605 with which commands are provided to the vehicle for automated driving and sensory input may be provided from the vehicle. The mobile device 600 may, for example, include one or more processors 602, memory 604, and an external interface including, e.g., a Wireless Wide Area Network (WWAN) transceiver 610, and a Wireless Local Area Network (WLAN) transceiver 640, which may be operatively coupled with one or more connections 606 (e.g., buses, lines, fibers, links, etc.) to non-transitory computer readable medium 620 and memory 604. The mobile device 600 may further include additional items, which are not shown, such as a user interface that may include e.g., a display, a keypad or other input device, such as virtual keypad on the display, through which a user may interface with the user device, or a satellite positioning system receiver. In certain example implementations, all or part of mobile device 600 may take the form of a chipset, and/or the like. Transceiver 610 may be, e.g., a cellular transceiver, and may be configured to transmit and receive inter-vehicle communications in the wireless network, as illustrated in FIG. 1. The transceiver 610 may include a transmitter 612 enabled to transmit one or more signals over one or more types of wireless communication networks and a receiver 614 to receive one or more signals transmitted over the one or more types of wireless communication networks. Transceiver 640 may be, e.g., a short range transceiver, and may be configured to transmit and receive inter-vehicle communications in the wireless network, as illustrated in FIG. 1. The transceiver 640 may include a transmitter 642 enabled to transmit one or more signals over one or more types of wireless communication networks and a receiver 644 to receive one or more signals transmitted over the one or more types of wireless communication networks. The transceivers 610 and 640 enable the mobile device 600 to communicate with transportation entities using D2D communication links, such as DSRC, C-V2X, or 5G NR.

In some embodiments, mobile device 600 may include antenna 611, which may be internal or external. The antenna 611 may be used to transmit and/or receive signals processed by transceiver 610 and/or transceiver 640. In some embodiments, antenna 611 may be coupled to transceiver 610 and/or transceiver 640. In some embodiments, measurements of signals received (transmitted) by mobile device 600 may be performed at the point of connection of the antenna 611 and transceiver 610 and/or transceiver 640. For example, the measurement point of reference for received (transmitted) RF signal measurements may be an input (output) terminal of the receivers 614, 644 (transmitters 612, 642) and an output (input) terminal of the antenna 611. In a mobile device 600 with multiple antennas 611 or antenna arrays, the antenna connector may be viewed as a virtual point representing the aggregate output (input) of multiple antennas.

The one or more processors 602 may be implemented using a combination of hardware, firmware, and software. For example, the one or more processors 602 may be configured to perform the functions discussed herein by implementing one or more instructions or program code 608 on a non-transitory computer readable medium, such as medium 620 and/or memory 604. In some embodiments, the one or more processors 602 may represent one or more circuits configurable to perform at least a portion of a data signal computing procedure or process related to the operation of mobile device 600.

The medium 620 and/or memory 604 may store instructions or program code 608 that contain executable code or software instructions that when executed by the one or more processors 602 cause the one or more processors 602 to operate as a special purpose computer programmed to perform the techniques disclosed herein. As illustrated in mobile device 600, the medium 620 and/or memory 604 may include one or more components or modules that may be implemented by the one or more processors 602 to perform the methodologies described herein. While the components or modules are illustrated as software in medium 620 that is executable by the one or more processors 602, it should be understood that the components or modules may be stored in memory 604 or may be dedicated hardware either in the one or more processors 602 or off the processors.

A number of software modules and data tables may reside in the medium 620 and/or memory 604 and be utilized by the one or more processors 602 in order to manage both communications and the functionality described herein. It should be appreciated that the organization of the contents of the medium 620 and/or memory 604 as shown in mobile device 600 is merely exemplary, and as such the functionality of the modules and/or data structures may be combined, separated, and/or be structured in different ways depending upon the implementation of the mobile device 600.

The medium 620 and/or memory 604 may include a cluster representative module 622 that when implemented by the one or more processors 602 configures the one or more processors 602 to determine that the mobile device 600 is designated as the representative of a cluster of mobile devices, e.g. traveling in a mobile device platoon. By way of example, the one or more processors 602 may be configured to determine that the mobile device 600 is the representative of a cluster of mobile devices based on being in a specific geometric position, e.g., center, of the cluster of mobile devices, or based on other factors, such as highest signal power in the cluster of mobile devices.

The medium 620 and/or memory 604 may include a PRS receive module 624 that when implemented by the one or more processors 602 configures the one or more processors 602 to receive a ranging signal (PRS), via transceiver 640, that is broadcast by other mobile devices in other mobile devices. For example, the PRS may be broadcast from a representative, e.g., center, mobile device from another cluster, or from various mobile devices within the same cluster of mobile devices as mobile device 600 or from a different cluster. The PRS may be broadcast, e.g. using short range communications.

The medium 620 and/or memory 604 may include a cluster/PRS information receive module 626 that when implemented by the one or more processors 602 configures the one or more processors 602 to receive, via transceiver 640, cluster information for a separate cluster, and information relevant to the received PRS, such as time of transmissions and/or a location of the other mobile device at the time of broadcast, which may be broadcast along with the PRS broadcast or in a separate ITS message from the separate cluster. The cluster information, for example, may include the speed, length, the number of mobile devices, the velocity, the location, etc., of the separate cluster.

The medium 620 and/or memory 604 may include a PRS transmit module 628 that when implemented by the one or more processors 602 configures the one or more processors 602 to broadcast a ranging signal (PRS), via transceiver 640. For example, the PRS may be broadcast by mobile device 600 as a representative of a cluster, e.g., for inter-cluster distance determination or as a mobile device for intra-cluster distance determination. The PRS may be broadcast, e.g. using short range communications, which may be received by other mobile device directly or by infrastructure entities, such as an RSU.

The medium 620 and/or memory 604 may include a cluster/PRS information transmit module 630 that when implemented by the one or more processors 602 configures the one or more processors 602 to transmit, via transceiver 640, cluster information for the cluster that the mobile device 600 represents, and information relevant to the broadcast PRS, such as time of transmissions and/or a location of the mobile device 600 at the time of broadcast, which may be broadcast along with the PRS broadcast or in a separate ITS message. The cluster information, for example, may include the speed, length, the number of mobile devices, the velocity, the location, etc., of the separate cluster. The cluster information may be stored, e.g., in memory 604 or medium 620, and may be generated based on information received during formation of the cluster (e.g., number of mobile devices and length) and/or current information for the cluster (e.g., speed, velocity, location).

The medium 620 and/or memory 604 may include a distance module 632 that when implemented by the one or more processors 602 configures the one or more processors 602 to determine a distance, e.g., range, between the mobile device 600 and the mobile device broadcasting PRS, e.g., using known ranging or positioning techniques, such as RTT, TDOA, etc. Where mobile device 600 represents a cluster of mobile devices, and the broadcasting mobile device is a representative of a different cluster of mobile devices, the determined distance serves as the distance between clusters, e.g., the inter-cluster distance. In some implementations, e.g., where a RSU is used to determine inter-cluster distances, the distance module 632 may configure the one or more processors 602 to receive the distance to another cluster, via transceiver 640, from an RSU or other infrastructure entity.

The medium 620 and/or memory 604 may include a threshold module 634 that when implemented by the one or more processors 602 configures the one or more processors 602 to generate a predetermined threshold. The predetermined threshold, for example, may be static threshold stored in memory 604 or medium 620 or may be a variable threshold. For example, the predetermined threshold may be generated based on based on cluster information for the cluster in which the mobile device 600 is located, such as speed, length, number of mobile devices, velocity, location, etc.; cluster information for another cluster, e.g., received via cluster information receive module 626; relative information for the clusters, such as relative directions of travel of the clusters and/or stored history of inter-cluster distances, e.g., the rate of change in the determined distances; or a combination thereof.

The medium 620 and/or memory 604 may include a compare module 636 that when implemented by the one or more processors 602 configures the one or more processors 602 to compare a determined inter-cluster distance (e.g., generated via distance module 632) and the predetermined threshold (e.g., generated via threshold module 634), to determine if the determined inter-cluster distance is greater than or less than the predetermined threshold.

The medium 620 and/or memory 604 may include a PRS instructions module 638 that when implemented by the one or more processors 602 configures the one or more processors 602 to transmit a signal, via transceiver 640, to other mobile devices in the cluster to begin broadcasting PRS, e.g., if the determined inter-cluster distance is less than the predetermined threshold, or to stop broadcasting PRS, e.g., if the determined inter-cluster distance is greater than the predetermined threshold.

The methodologies described herein may be implemented by various means depending upon the application. For example, these methodologies may be implemented in hardware, firmware, software, or any combination thereof. For a hardware implementation, the one or more processors 602 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine readable medium tangibly embodying instructions may be used in implementing the methodologies described herein. For example, software codes may be stored in a non-transitory computer readable medium 620 or memory 604 that is connected to and executed by the one or more processors 602. Memory may be implemented within the one or more processors or external to the one or more processors. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or program code 608 on a non-transitory computer readable medium, such as medium 620 and/or memory 604. Examples include computer readable media encoded with a data structure and computer readable media encoded with a computer program 608. For example, the non-transitory computer readable medium including program code 608 stored thereon may include program code 608 to support inter-cluster ranging and intra-cluster ranging in a manner consistent with disclosed embodiments. Non-transitory computer readable medium 620 includes physical computer storage media. A storage medium may be any available medium that can be accessed by a computer. By way of example, and not limitation, such non-transitory computer readable media can comprise RAM, ROM, EEPROM, CD-ROM or other optical disk storage, magnetic disk storage or other magnetic storage devices, or any other medium that can be used to store desired program code 608 in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer readable media.

In addition to storage on computer readable medium 620, instructions and/or data may be provided as signals on transmission media included in a communication apparatus. For example, a communication apparatus may include a transceiver 610 having signals indicative of instructions and data. The instructions and data are configured to cause one or more processors to implement the functions outlined in the claims. That is, the communication apparatus includes transmission media with signals indicative of information to perform disclosed functions.

Memory 604 may represent any data storage mechanism. Memory 604 may include, for example, a primary memory and/or a secondary memory. Primary memory may include, for example, a random access memory, read only memory, etc. While illustrated in this example as being separate from one or more processors 602, it should be understood that all or part of a primary memory may be provided within or otherwise co-located/coupled with the one or more processors 602. Secondary memory may include, for example, the same or similar type of memory as primary memory and/or one or more data storage devices or systems, such as, for example, a disk drive, an optical disc drive, a tape drive, a solid state memory drive, etc.

In certain implementations, secondary memory may be operatively receptive of, or otherwise configurable to couple to a non-transitory computer readable medium 620. As such, in certain example implementations, the methods and/or apparatuses presented herein may take the form in whole or part of a computer readable medium 620 that may include computer implementable code 608 stored thereon, which if executed by one or more processors 602 may be operatively enabled to perform all or portions of the example operations as described herein. Computer readable medium 620 may be a part of memory 604.

A first mobile device capable, such as mobile device 600, is capable of performing ranging between clusters of mobile devices, the is a first representative mobile device in a first cluster of mobile devices, and wherein a cluster of mobile devices comprises at least two mobile devices. The first mobile device may include a means for receiving a ranging signal broadcast by a second mobile device that is in a second cluster of mobile devices, wherein the second mobile device is a second representative mobile device in the second cluster of mobile devices and no other mobile device in the second cluster of mobile devices broadcasts a ranging signal, which may be, e.g., an external interface such as WLAN transceiver 640, and one or more processors 602 with dedicated hardware or implementing executable code or software instructions 608 in computer readable medium 620 and/or memory 604 such as the PRS receive module 624. A means for determining a distance between the first cluster of mobile devices and the second cluster of mobile devices based on the ranging signal received from the second representative mobile device in the second cluster of mobile devices may be, e.g., one or more processors 602 with dedicated hardware or implementing executable code or software instructions 608 in computer readable medium 620 and/or memory 604 such as the distance module 632. A means for determining if the distance between the first cluster of mobile devices and the second cluster of mobile devices is greater than a predetermined threshold may be, e.g., one or more processors 602 with dedicated hardware or implementing executable code or software instructions 608 in computer readable medium 620 and/or memory 604 such as the compare module 636. A means for broadcasting a ranging signal, wherein no other mobile device in the first cluster of mobile devices broadcasts a ranging signal when the distance between the first cluster of mobile devices and the second cluster of mobile devices is greater than the predetermined threshold may be, e.g., an external interface such as WLAN transceiver 640, and one or more processors 602 with dedicated hardware or implementing executable code or software instructions 608 in computer readable medium 620 and/or memory 604 such as the PRS transmit module 628.

In one implementation, the first mobile device may include means for transmitting a signal to other mobile devices in the first cluster of mobile devices to begin broadcasting ranging signals when the distance between the first cluster of mobile devices and the second cluster of mobile devices is less than the predetermined threshold., which may be, e.g., an external interface such as WLAN transceiver 640, and one or more processors 602 with dedicated hardware or implementing executable code or software instructions 608 in computer readable medium 620 and/or memory 604 such as the PRS instructions module 638.

In one implementation, the first mobile device may include means for receiving cluster information for the second cluster of mobile devices from the second representative mobile device, wherein the cluster information for the second cluster of mobile devices comprises one or more of a size, speed, number of members, velocity, or a combination thereof, wherein the predetermined threshold is generated based on the cluster information for the second cluster of mobile devices and cluster information for the first cluster of mobile devices, which may be, e.g., an external interface such as WLAN transceiver 640, and one or more processors 602 with dedicated hardware or implementing executable code or software instructions 608 in computer readable medium 620 and/or memory 604 such as the cluster/PRS receive module 626 and the threshold module 634.

In one implementation, the first mobile device may include means for storing determined distances between the first cluster of mobile devices and the second cluster of mobile devices, wherein the predetermined threshold is generated based at least partially on stored determined distances, which may be, e.g., an external interface such as WLAN transceiver 640, memory 604, and one or more processors 602 with dedicated hardware or implementing executable code or software instructions 608 in computer readable medium 620 and/or memory 604 such as the distance module 632 and threshold module 634.

In one implementation, the first mobile device may include means for broadcasting cluster information for the first cluster of mobile devices with the ranging signal, wherein the cluster information for the first cluster of mobile devices comprises one or more of a size, speed, number of members, velocity, or a combination thereof, which may be, e.g., an external interface such as WLAN transceiver 640, and one or more processors 602 with dedicated hardware or implementing executable code or software instructions 608 in computer readable medium 620 and/or memory 604 such as the cluster/PRS transmit module 630.

Reference throughout this specification to "one example", "an example", "certain examples", or "exemplary implementation" means that a particular feature, structure, or characteristic described in connection with the feature and/or example may be included in at least one feature and/or example of claimed subject matter. Thus, the appearances of the phrase "in one example", "an example", "in certain examples" or "in certain implementations" or other like phrases in various places throughout this specification are not necessarily all referring to the same feature, example, and/or limitation. Furthermore, the particular features, structures, or characteristics may be combined in one or more examples and/or features.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared, or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures, or characteristics. Though, it should be noted that this is merely an illustrative example and claimed subject matter is not limited to this example.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

In view of this description, embodiments may include different combinations of features. Implementation examples are described in the following numbered clauses:

1. A method performed by a first mobile device that is in a first cluster of mobile devices for ranging between clusters of mobile devices, wherein the first mobile device is a first representative mobile device in the first cluster of mobile devices, and wherein a cluster of mobile devices comprises at least two mobile devices, the method comprising:
   receiving a ranging signal broadcast by a second mobile device that is in a second cluster of mobile devices, wherein the second mobile device is a second representative mobile device in the second cluster of mobile devices and no other mobile device in the second cluster of mobile devices broadcasts a ranging signal;
   determining a distance between the first cluster of mobile devices and the second cluster of mobile devices based on the ranging signal received from the second representative mobile device in the second cluster of mobile devices;
   determining if the distance between the first cluster of mobile devices and the second cluster of mobile devices is greater than a predetermined threshold; and
   broadcasting a ranging signal, wherein no other mobile device in the first cluster of mobile devices broadcasts a ranging signal when the distance between the first cluster of mobile devices and the second cluster of mobile devices is greater than the predetermined threshold.

Clause 2. The method of clause 1, further comprising:
   transmitting a signal to other mobile devices in the first cluster of mobile devices to begin broadcasting ranging signals when the distance between the first cluster of mobile devices and the second cluster of mobile devices is less than the predetermined threshold.

Clause 3. The method of either clause 1 or 2, wherein the predetermined threshold is generated based on cluster information for the first cluster of mobile devices, wherein the cluster information for the first cluster of mobile devices comprises one or more of a size, speed, number of members, velocity, or a combination thereof.

Clause 4. The method of any of clauses 1-3, further comprising:
   receiving cluster information for the second cluster of mobile devices from the second representative mobile device, wherein the cluster information for the second cluster of mobile devices comprises one or more of a size, speed, number of members, velocity, or a combination thereof; and
   wherein the predetermined threshold is generated based on the cluster information for the second cluster of mobile devices and cluster information for the first cluster of mobile devices.

Clause 5. The method of any of clauses 1-4, further comprising:
   storing determined distances between the first cluster of mobile devices and the second cluster of mobile devices;
   wherein the predetermined threshold is generated based at least partially on stored determined distances.

Clause 6. The method of any of clauses 1-5, further comprising:
   broadcasting cluster information for the first cluster of mobile devices with the ranging signal, wherein the cluster information for the first cluster of mobile devices comprises one or more of a size, speed, number of members, velocity, or a combination thereof.

Clause 7. The method of any of clauses 1-6, wherein the first mobile device is designated as the first representative mobile device based on the first mobile device being a center mobile device in the first cluster of mobile devices.

Clause 8. The method of any of clauses 1-7, wherein the first mobile device is one of a semiautonomous or autonomous ground vehicle or a semiautonomous or autonomous aerial vehicle.

Clause 9. A first mobile device capable performing ranging between clusters of mobile devices, the first mobile device is a first representative mobile device in a first cluster of mobile devices, and wherein a cluster of mobile devices comprises at least two mobile devices, comprising:
an external interface for receiving and sending messages;
at least one memory; and
at least one processor coupled to the external interface and the at least one memory, the at least one processor configured to:
receive, via the external interface, a ranging signal broadcast by a second mobile device that is in a second cluster of mobile devices, wherein the second mobile device is a second representative mobile device in the second cluster of mobile devices and no other mobile device in the second cluster of mobile devices broadcasts a ranging signal;
determine a distance between the first cluster of mobile devices and the second cluster of mobile devices based on the ranging signal received from the second representative mobile device in the second cluster of mobile devices;
determine if the distance between the first cluster of mobile devices and the second cluster of mobile devices is greater than a predetermined threshold; and
broadcast, via the external interface, a ranging signal, wherein no other mobile device in the first cluster of mobile devices broadcasts a ranging signal when the distance between the first cluster of mobile devices and the second cluster of mobile devices is greater than the predetermined threshold.

Clause 10. The first mobile device of clause 9, wherein the at least one processor is further configured to:
transmit, via the external interface, a signal to other mobile devices in the first cluster of mobile devices to begin broadcasting ranging signals when the distance between the first cluster of mobile devices and the second cluster of mobile devices is less than the predetermined threshold.

Clause 11. The first mobile device of either of clauses 9 or 10, wherein the predetermined threshold is generated based on cluster information for the first cluster of mobile devices, wherein the cluster information for the first cluster of mobile devices comprises one or more of a size, speed, number of members, velocity, or a combination thereof.

Clause 12. The first mobile device of any of clauses 9-11, wherein the at least one processor is further configured to:
receive, via the external interface, cluster information for the second cluster of mobile devices from the second representative mobile device, wherein the cluster information for the second cluster of mobile devices comprises one or more of a size, speed, number of members, velocity, or a combination thereof; and
wherein the predetermined threshold is generated based on the cluster information for the second cluster of mobile devices and cluster information for the first cluster of mobile devices.

Clause 13. The first mobile device of any of clauses 9-12, wherein the at least one processor is further configured to:
store determined distances between the first cluster of mobile devices and the second cluster of mobile devices;
wherein the predetermined threshold is generated based at least partially on stored determined distances.

Clause 14. The first mobile device of any of clauses 9-13, wherein the at least one processor is further configured to:
broadcast, via the external interface, cluster information for the first cluster of mobile devices with the ranging signal, wherein the cluster information for the first cluster of mobile devices comprises one or more of a size, speed, number of members, velocity, or a combination thereof.

Clause 15. The first mobile device of any of clauses 9-14, wherein the first mobile device is designated as the first representative mobile device based on the first mobile device being a center mobile device in the first cluster of mobile devices.

Clause 16. The first mobile device of any of clauses 9-15, wherein the first mobile device is one of a semiautonomous or autonomous ground vehicle or a semiautonomous or autonomous aerial vehicle.

Clause 17. A first mobile device capable performing ranging between clusters of mobile devices, the is a first representative mobile device in a first cluster of mobile devices, and wherein a cluster of mobile devices comprises at least two mobile devices, comprising:
means for receiving a ranging signal broadcast by a second mobile device that is in a second cluster of mobile devices, wherein the second mobile device is a second representative mobile device in the second cluster of mobile devices and no other mobile device in the second cluster of mobile devices broadcasts a ranging signal;
means for determining a distance between the first cluster of mobile devices and the second cluster of mobile devices based on the ranging signal received from the second representative mobile device in the second cluster of mobile devices;
means for determining if the distance between the first cluster of mobile devices and the second cluster of mobile devices is greater than a predetermined threshold; and
means for broadcasting a ranging signal, wherein no other mobile device in the first cluster of mobile devices broadcasts a ranging signal when the distance between the first cluster of mobile devices and the second cluster of mobile devices is greater than the predetermined threshold.

Clause 18. The first mobile device of clause 17, further comprising:
means for transmitting a signal to other mobile devices in the first cluster of mobile devices to begin broadcasting ranging signals when the distance between the first cluster of mobile devices and the second cluster of mobile devices is less than the predetermined threshold.

Clause 19. The first mobile device of either of clauses 17 or 18, wherein the predetermined threshold is generated based on cluster information for the first cluster of mobile devices, wherein the cluster information for the first cluster of mobile devices comprises one or more of a size, speed, number of members, velocity, or a combination thereof.

Clause 20. The first mobile device of any of clauses 17-19, further comprising:
  means for receiving cluster information for the second cluster of mobile devices from the second representative mobile device, wherein the cluster information for the second cluster of mobile devices comprises one or more of a size, speed, number of members, velocity, or a combination thereof; and
  wherein the predetermined threshold is generated based on the cluster information for the second cluster of mobile devices and cluster information for the first cluster of mobile devices.

Clause 21. The first mobile device of any of clauses 17-20, further comprising:
  means for storing determined distances between the first cluster of mobile devices and the second cluster of mobile devices;
  wherein the predetermined threshold is generated based at least partially on stored determined distances.

Clause 22. The first mobile device of any of clauses 17-21, further comprising:
  means for broadcasting cluster information for the first cluster of mobile devices with the ranging signal, wherein the cluster information for the first cluster of mobile devices comprises one or more of a size, speed, number of members, velocity, or a combination thereof.

Clause 23. The first mobile device of any of clauses 17-22, wherein the first mobile device is designated as the first representative mobile device based on the first mobile device being a center mobile device in the first cluster of mobile devices.

Clause 24. The first mobile device of any of clauses 17-23, wherein the first mobile device is one of a semiautonomous or autonomous ground vehicle or a semiautonomous or autonomous aerial vehicle.

Clause 25. A non-transitory computer readable storage medium including program code stored thereon, the program code is operable to configure at least one processor in a first mobile device to perform ranging between clusters of mobile devices, the first mobile device is a first representative mobile device in a first cluster of mobile devices, and wherein a cluster of mobile devices comprises at least two mobile devices, the program code including instructions to:
  receive a ranging signal broadcast by a second mobile device that is in a second cluster of mobile devices, wherein the second mobile device is a second representative mobile device in the second cluster of mobile devices and no other mobile device in the second cluster of mobile devices broadcasts a ranging signal;
  determine a distance between the first cluster of mobile devices and the second cluster of mobile devices based on the ranging signal received from the second representative mobile device in the second cluster of mobile devices;
  determine if the distance between the first cluster of mobile devices and the second cluster of mobile devices is greater than a predetermined threshold; and
  broadcast a ranging signal, wherein no other mobile device in the first cluster of mobile devices broadcasts a ranging signal when the distance between the first cluster of mobile devices and the second cluster of mobile devices is greater than the predetermined threshold.

Clause 26. The non-transitory computer readable storage medium of clause 25, wherein the program code further includes instructions to:
  transmit a signal to other mobile devices in the first cluster of mobile devices to begin broadcasting ranging signals when the distance between the first cluster of mobile devices and the second cluster of mobile devices is less than the predetermined threshold.

Clause 27. The non-transitory computer readable storage medium of either of clauses 25 or 26, wherein the predetermined threshold is generated based on cluster information for the first cluster of mobile devices, wherein the cluster information for the first cluster of mobile devices comprises one or more of a size, speed, number of members, velocity, or a combination thereof.

Clause 28. The non-transitory computer readable storage medium of any of clauses 25-27, wherein the program code further includes instructions to:
  receive cluster information for the second cluster of mobile devices from the second representative mobile device, wherein the cluster information for the second cluster of mobile devices comprises one or more of a size, speed, number of members, velocity, or a combination thereof; and
  wherein the predetermined threshold is generated based on the cluster information for the second cluster of mobile devices and cluster information for the first cluster of mobile devices.

Clause 29. The non-transitory computer readable storage medium of any of clauses 25-28, wherein the program code further includes instructions to:
  store determined distances between the first cluster of mobile devices and the second cluster of mobile devices;
  wherein the predetermined threshold is generated based at least partially on stored determined distances.

Clause 30. The non-transitory computer readable storage medium of any of clauses 25-29, wherein the program code further includes instructions to:
  broadcast cluster information for the first cluster of mobile devices with the ranging signal, wherein the cluster information for the first cluster of mobile devices comprises one or more of a size, speed, number of members, velocity, or a combination thereof.

Clause 31. The non-transitory computer readable storage medium of any of clauses 25-30, wherein the first mobile device is designated as the first representative mobile device based on the first mobile device being a center mobile device in the first cluster of mobile devices.

Clause 32. The non-transitory computer readable storage medium of any of clauses 25-31, wherein the first mobile device is one of a semiautonomous or autonomous ground vehicle or a semiautonomous or autonomous aerial vehicle.

Therefore, it is intended that claimed subject matter not be limited to the particular examples disclosed, but that such claimed subject matter may also include all aspects falling within the scope of appended claims, and equivalents thereof.

What is claimed is:

1. A method performed by a first mobile device that is in a first cluster of mobile devices for ranging between clusters of mobile devices, wherein the first mobile device is a first representative mobile device in the first cluster of mobile devices, and wherein a cluster of mobile devices comprises at least two mobile devices, the method comprising:
  receiving a ranging signal broadcast by a second mobile device that is in a second cluster of mobile devices, wherein the second mobile device is a second representative mobile device in the second cluster of mobile devices and no other mobile device in the second cluster of mobile devices broadcasts a ranging signal;
determining a distance between the first cluster of mobile devices and the second cluster of mobile devices based on the ranging signal received from the second representative mobile device in the second cluster of mobile devices;
determining if the distance between the first cluster of mobile devices and the second cluster of mobile devices is greater than a predetermined threshold;
broadcasting a ranging signal, wherein no other mobile device in the first cluster of mobile devices broadcasts a ranging signal when the distance between the first cluster of mobile devices and the second cluster of mobile devices is greater than the predetermined threshold; and
transmitting a signal to other mobile devices in the first cluster of mobile devices to begin broadcasting ranging signals in association with the ranging signal broadcast by the second mobile device and when the distance between the first cluster of mobile devices and the second cluster of mobile devices is less than the predetermined threshold.

2. The method of claim 1, wherein the predetermined threshold is generated based on cluster information for the first cluster of mobile devices, wherein the cluster information for the first cluster of mobile devices comprises one or more of a size, speed, number of members, velocity, or a combination thereof.

3. The method of claim 1, further comprising:
receiving cluster information for the second cluster of mobile devices from the second representative mobile device, wherein the cluster information for the second cluster of mobile devices comprises one or more of a size, speed, number of members, velocity, or a combination thereof; and
wherein the predetermined threshold is generated based on the cluster information for the second cluster of mobile devices and cluster information for the first cluster of mobile devices.

4. The method of claim 1, further comprising:
storing determined distances between the first cluster of mobile devices and the second cluster of mobile devices;
wherein the predetermined threshold is generated based at least partially on stored determined distances.

5. The method of claim 1, further comprising:
broadcasting cluster information for the first cluster of mobile devices with the ranging signal, wherein the cluster information for the first cluster of mobile devices comprises one or more of a size, speed, number of members, velocity, or a combination thereof.

6. The method of claim 1, wherein the first mobile device is designated as the first representative mobile device based on the first mobile device being a center mobile device in the first cluster of mobile devices.

7. The method of claim 1, wherein the first mobile device is one of a semiautonomous or autonomous ground vehicle or a semiautonomous or autonomous aerial vehicle.

8. A first mobile device capable performing ranging between clusters of mobile devices, the first mobile device is a first representative mobile device in a first cluster of mobile devices, and wherein a cluster of mobile devices comprises at least two mobile devices, comprising:
an external interface for receiving and sending messages;
at least one memory; and
at least one processor coupled to the external interface and the at least one memory, the at least one processor configured to:
receive, via the external interface, a ranging signal broadcast by a second mobile device that is in a second cluster of mobile devices, wherein the second mobile device is a second representative mobile device in the second cluster of mobile devices and no other mobile device in the second cluster of mobile devices broadcasts a ranging signal;
determine a distance between the first cluster of mobile devices and the second cluster of mobile devices based on the ranging signal received from the second representative mobile device in the second cluster of mobile devices;
determine if the distance between the first cluster of mobile devices and the second cluster of mobile devices is greater than a predetermined threshold;
broadcast, via the external interface, a ranging signal, wherein no other mobile device in the first cluster of mobile devices broadcasts a ranging signal when the distance between the first cluster of mobile devices and the second cluster of mobile devices is greater than the predetermined threshold; and
transmit, via the external interface, a signal to other mobile devices in the first cluster of mobile devices to begin broadcasting ranging signals in association with the ranging signal broadcast by the second mobile device and when the distance between the first cluster of mobile devices and the second cluster of mobile devices is less than the predetermined threshold.

9. The first mobile device of claim 8, wherein the predetermined threshold is generated based on cluster information for the first cluster of mobile devices, wherein the cluster information for the first cluster of mobile devices comprises one or more of a size, speed, number of members, velocity, or a combination thereof.

10. The first mobile device of claim 8, wherein the at least one processor is further configured to:
receive, via the external interface, cluster information for the second cluster of mobile devices from the second representative mobile device, wherein the cluster information for the second cluster of mobile devices comprises one or more of a size, speed, number of members, velocity, or a combination thereof; and
wherein the predetermined threshold is generated based on the cluster information for the second cluster of mobile devices and cluster information for the first cluster of mobile devices.

11. The first mobile device of claim 8, wherein the at least one processor is further configured to:
store determined distances between the first cluster of mobile devices and the second cluster of mobile devices;
wherein the predetermined threshold is generated based at least partially on stored determined distances.

12. The first mobile device of claim 8, wherein the at least one processor is further configured to:
broadcast, via the external interface, cluster information for the first cluster of mobile devices with the ranging signal, wherein the cluster information for the first cluster of mobile devices comprises one or more of a size, speed, number of members, velocity, or a combination thereof.

13. The first mobile device of claim 8, wherein the first mobile device is designated as the first representative mobile device based on the first mobile device being a center mobile device in the first cluster of mobile devices.

14. The first mobile device of claim 8, wherein the first mobile device is one of a semiautonomous or autonomous ground vehicle or a semiautonomous or autonomous aerial vehicle.

15. A first mobile device capable performing ranging between clusters of mobile devices, the is a first representative mobile device in a first cluster of mobile devices, and wherein a cluster of mobile devices comprises at least two mobile devices, comprising:
  means for receiving a ranging signal broadcast by a second mobile device that is in a second cluster of mobile devices, wherein the second mobile device is a second representative mobile device in the second cluster of mobile devices and no other mobile device in the second cluster of mobile devices broadcasts a ranging signal;
  means for determining a distance between the first cluster of mobile devices and the second cluster of mobile devices based on the ranging signal received from the second representative mobile device in the second cluster of mobile devices;
  means for determining if the distance between the first cluster of mobile devices and the second cluster of mobile devices is greater than a predetermined threshold;
  means for broadcasting a ranging signal, wherein no other mobile device in the first cluster of mobile devices broadcasts a ranging signal when the distance between the first cluster of mobile devices and the second cluster of mobile devices is greater than the predetermined threshold; and
  means for transmitting a signal to other mobile devices in the first cluster of mobile devices to begin broadcasting ranging signals in association with the ranging signal broadcast by the second mobile device and when the distance between the first cluster of mobile devices and the second cluster of mobile devices is less than the predetermined threshold.

16. The first mobile device of claim 15, wherein the predetermined threshold is generated based on cluster information for the first cluster of mobile devices, wherein the cluster information for the first cluster of mobile devices comprises one or more of a size, speed, number of members, velocity, or a combination thereof.

17. The first mobile device of claim 15, further comprising:
  means for receiving cluster information for the second cluster of mobile devices from the second representative mobile device, wherein the cluster information for the second cluster of mobile devices comprises one or more of a size, speed, number of members, velocity, or a combination thereof; and
  wherein the predetermined threshold is generated based on the cluster information for the second cluster of mobile devices and cluster information for the first cluster of mobile devices.

18. The first mobile device of claim 15, further comprising:
  means for storing determined distances between the first cluster of mobile devices and the second cluster of mobile devices;
  wherein the predetermined threshold is generated based at least partially on stored determined distances.

19. The first mobile device of claim 15, further comprising:
  means for broadcasting cluster information for the first cluster of mobile devices with the ranging signal, wherein the cluster information for the first cluster of mobile devices comprises one or more of a size, speed, number of members, velocity, or a combination thereof.

20. The first mobile device of claim 15, wherein the first mobile device is designated as the first representative mobile device based on the first mobile device being a center mobile device in the first cluster of mobile devices.

21. The first mobile device of claim 15, wherein the first mobile device is one of a semiautonomous or autonomous ground vehicle or a semiautonomous or autonomous aerial vehicle.

22. A non-transitory computer readable storage medium including program code stored thereon, the program code is operable to configure at least one processor in a first mobile device to perform ranging between clusters of mobile devices, the first mobile device is a first representative mobile device in a first cluster of mobile devices, and wherein a cluster of mobile devices comprises at least two mobile devices, the program code including instructions to:
  receive a ranging signal broadcast by a second mobile device that is in a second cluster of mobile devices, wherein the second mobile device is a second representative mobile device in the second cluster of mobile devices and no other mobile device in the second cluster of mobile devices broadcasts a ranging signal;
  determine a distance between the first cluster of mobile devices and the second cluster of mobile devices based on the ranging signal received from the second representative mobile device in the second cluster of mobile devices;
  determine if the distance between the first cluster of mobile devices and the second cluster of mobile devices is greater than a predetermined threshold;
  broadcast a ranging signal, wherein no other mobile device in the first cluster of mobile devices broadcasts a ranging signal when the distance between the first cluster of mobile devices and the second cluster of mobile devices is greater than the predetermined threshold; and
  transmit a signal to other mobile devices in the first cluster of mobile devices to begin broadcasting ranging signals in association with the ranging signal broadcast by the second mobile device and when the distance between the first cluster of mobile devices and the second cluster of mobile devices is less than the predetermined threshold.

23. The non-transitory computer readable storage medium of claim 22, wherein the predetermined threshold is generated based on cluster information for the first cluster of mobile devices, wherein the cluster information for the first cluster of mobile devices comprises one or more of a size, speed, number of members, velocity, or a combination thereof.

24. The non-transitory computer readable storage medium of claim 22, wherein the program code further includes instructions to:
  receive cluster information for the second cluster of mobile devices from the second representative mobile device, wherein the cluster information for the second cluster of mobile devices comprises one or more of a size, speed, number of members, velocity, or a combination thereof; and wherein the predetermined threshold is generated based on the cluster information for the second cluster of mobile devices and cluster information for the first cluster of mobile devices.

25. The non-transitory computer readable storage medium of claim 22, wherein the program code further includes instructions to:
  store determined distances between the first cluster of mobile devices and the second cluster of mobile devices;
  wherein the predetermined threshold is generated based at least partially on stored determined distances.

26. The non-transitory computer readable storage medium of claim 22, wherein the program code further includes instructions to:
  broadcast cluster information for the first cluster of mobile devices with the ranging signal, wherein the cluster information for the first cluster of mobile devices comprises one or more of a size, speed, number of members, velocity, or a combination thereof.

27. The non-transitory computer readable storage medium of claim 22, wherein the first mobile device is designated as the first representative mobile device based on the first mobile device being a center mobile device in the first cluster of mobile devices.

28. The non-transitory computer readable storage medium of claim 22, wherein the first mobile device is one of a semiautonomous or autonomous ground vehicle or a semi-autonomous or autonomous aerial vehicle.

\* \* \* \* \*